US009253695B2

(12) United States Patent
Maruta

(10) Patent No.: US 9,253,695 B2
(45) Date of Patent: Feb. 2, 2016

(54) MOBILE COMMUNICATION SYSTEM AND RELAY NODE CONTROL METHOD, RELAY NODE MANAGEMENT DEVICE AND CONTROL METHOD THEREOF, AND NON-TRANSITORY COMPUTER READABLE MEDIUM STORING CONTROL PROGRAM

(75) Inventor: Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 172 days.

(21) Appl. No.: 14/000,242

(22) PCT Filed: Nov. 11, 2011

(86) PCT No.: PCT/JP2011/006318
§ 371 (c)(1),
(2), (4) Date: Aug. 19, 2013

(87) PCT Pub. No.: WO2012/131819
PCT Pub. Date: Oct. 4, 2012

(65) Prior Publication Data
US 2013/0324130 A1  Dec. 5, 2013

(30) Foreign Application Priority Data

Mar. 31, 2011  (JP) ................................. 2011-080950

(51) Int. Cl.
*H04W 36/16*  (2009.01)
*H04W 36/00*  (2009.01)
(Continued)

(52) U.S. Cl.
CPC ............ *H04W 36/16* (2013.01); *H04B 7/15528* (2013.01); *H04W 36/00* (2013.01); *H04W 8/26* (2013.01); *H04W 84/047* (2013.01)

(58) Field of Classification Search
CPC ..... H04W 84/047; H04W 8/26; H04W 88/04; H04W 12/08; H04W 48/16; H04W 36/0016; H04W 36/00; H04W 28/16; H04W 36/0022; H04W 16/00; H04W 36/0033; H04W 36/12; H04W 36/16; H04W 40/24; H04W 40/248; H04W 84/005; H04W 84/02
See application file for complete search history.

(56) References Cited

U.S. PATENT DOCUMENTS

2002/0075836 A1*  6/2002  Uematsu ........................ 370/338
2005/0207447 A1*  9/2005  Sekiguchi et al. ............ 370/475
(Continued)

FOREIGN PATENT DOCUMENTS

| EP | 1881720 A1 | 1/2008 |
|---|---|---|
| JP | 2004-56589 A | 2/2004 |

(Continued)

OTHER PUBLICATIONS

International Search Report for PCT/JP2011/006318 dated Dec. 6, 2011.
(Continued)

*Primary Examiner* — Daniel Lai
(74) *Attorney, Agent, or Firm* — Sughrue Mion, PLLC

(57) ABSTRACT

It is determined whether a situation where a plurality of relay nodes having the same identification information exist in a service area of one base station occurs and makes an inter-base station handover and, in the case where the duplication occurs, when changing identification information of a relay node so as to differentiate each identification information, a handover of a mobile station communicating with a relay node whose identification information is to be changed in a service area of the relay node is made from the relay node to a base station to thereby continue a service for the mobile station by the base station, and, after the identification information of the relay node is changed, a handover of the mobile station having been communicating with the relay node in the service area is made from the base station to the relay node to thereby restart a service.

8 Claims, 15 Drawing Sheets

(51) Int. Cl.
*H04B 7/155* (2006.01)
*H04W 84/04* (2009.01)
*H04W 8/26* (2009.01)

(56) References Cited

U.S. PATENT DOCUMENTS

| | | |
|---|---|---|
| 2009/0047956 A1* | 2/2009 | Moe et al. ............. 455/436 |
| 2009/0265455 A1* | 10/2009 | Hiraki ..................... 709/223 |
| 2010/0008258 A1 | 1/2010 | Ji et al. |
| 2010/0105395 A1 | 4/2010 | Ji et al. |
| 2011/0216741 A1* | 9/2011 | Yang et al. ............. 370/331 |
| 2011/0244851 A1* | 10/2011 | Gunnarsson et al. ...... 455/423 |

FOREIGN PATENT DOCUMENTS

| | | |
|---|---|---|
| JP | 2010-56857 A | 3/2010 |
| JP | 2010-537479 A | 12/2010 |
| JP | 2011-35783 A | 2/2011 |
| JP | 2011-193375 A | 9/2011 |
| WO | 2010/006212 A2 | 1/2010 |
| WO | 2010/086979 A1 | 8/2010 |

OTHER PUBLICATIONS

Communication dated Mar. 27, 2015 from the European Patent Office in counterpart European Application No. 11862359.4.

* cited by examiner

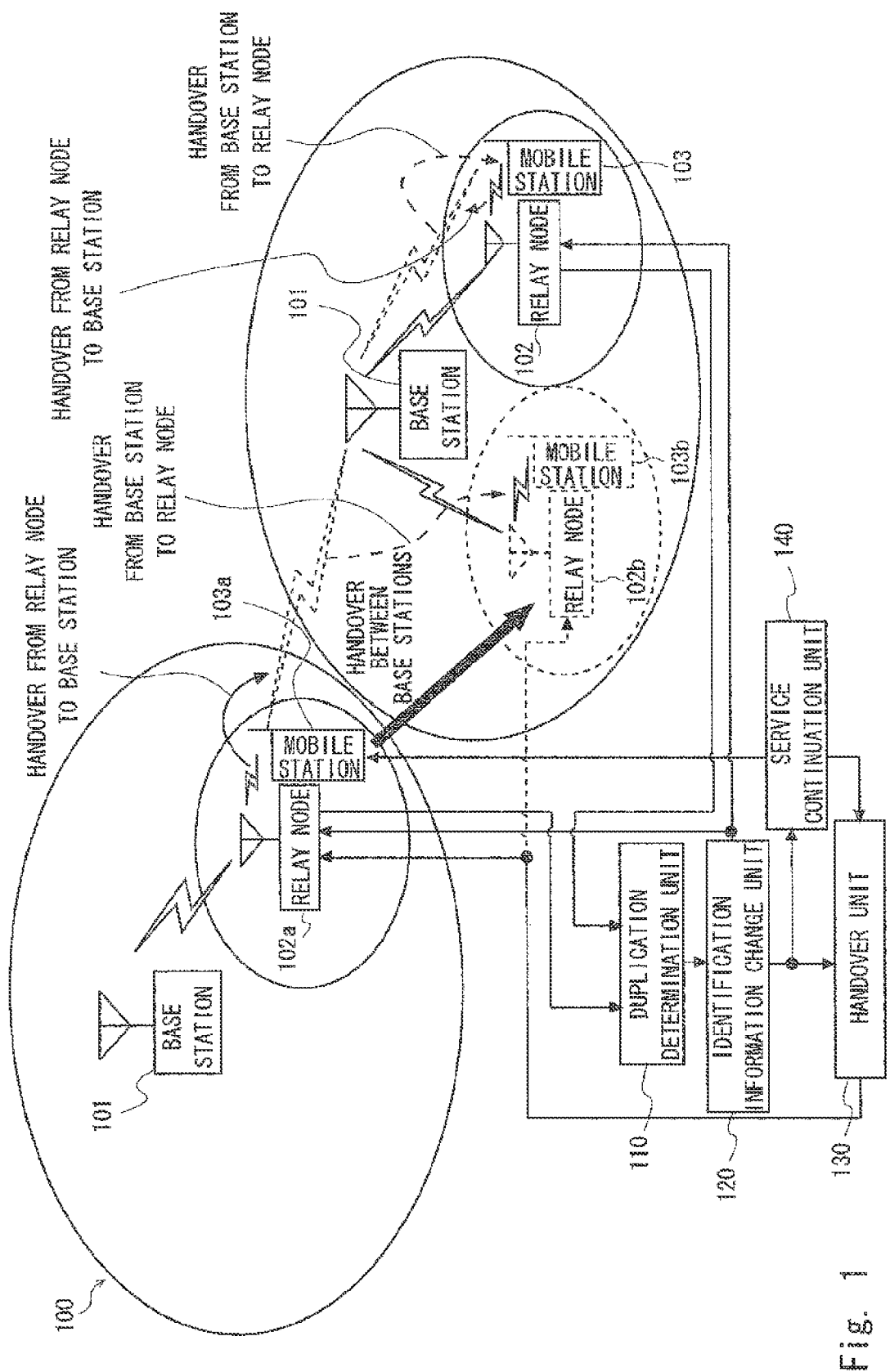

MOBILE COMMUNICATION SYSTEM AND RELAY NODE CONTROL METHOD, RELAY NODE MANAGEMENT DEVICE AND CONTROL METHOD THEREOF, AND NON-TRANSITORY COMPUTER READABLE MEDIUM STORING CONTROL PROGRAM

CROSS REFERENCE TO RELATED APPLICATIONS

This application is a National Stage of International Application No. PCT/JP2011/006318 filed Nov. 11, 2011, claiming priority based on Japanese Patent Application No. 2011-080950 filed Mar. 31, 2011, the contents of all of which are incorporated herein by reference in their entirety.

TECHNICAL FIELD

The present invention relates to a technique of a handover of a relay node between base stations in a mobile communication system including a mobile relay node.

BACKGROUND ART

In the above technical field, a technique to avoid setting a duplicate identification code at a connection of a wireless relay device to a base station is disclosed in Patent Literature 1. Further, a technique to avoid duplication of identification information in a cell of a base station by assigning identification information predetermined in each base station to a wireless relay node is disclosed in Patent Literature 2.

CITATION LIST

Patent Literature

PTL1: Japanese Unexamined Patent Application Publication No. 2004-056589
PTL2: Japanese Unexamined Patent Application Publication No. 2010-056857

SUMMARY OF INVENTION

Technical Problem

However, when identification information of a relay node is changed at the handover of the relay node from a base station to another base station, a service for a mobile station that is communicating with the relay node is interrupted during that time. The above Patent Literatures 1 and 2 merely describe a framework to assign identification information to a relay node and disclose nothing about control at the handover of a relay node from a base station to another base station. Particularly, no consideration is given to a process when there is a possibility that a plurality of relay nodes having the same identification information exist in a cell of one base station.

An exemplary object of the present invention is to provide a technique to solve the above problem.

Solution to Problem

To achieve the above object, a system according to one aspect of the invention is a mobile communication system including a mobile relay node that relays communication between a base station and a mobile station, which includes a duplication determination unit for determining whether a situation where a plurality of relay nodes having the same identification information exist in a service area of one base station occurs before the mobile relay node moves from one base station to another and makes an inter-base station handover; an identification information change unit for changing identification information of a relay node so that identification information are different from each other when the duplication determination unit determines that the situation where a plurality of relay nodes having the same identification information exist in one base station occurs; a handover unit for making an inter-base station handover of the relay node that moves from one base station to another after the identification information of the relay node is changed; and a service continuation unit for making a handover of a mobile station communicating with a relay node whose identification information is to be changed by the identification information change unit in a service area of the relay node from the relay node to a base station and thereby continuing a service for the mobile station by the base station, and, after the identification information of the relay node is changed, making a handover of the mobile station having been communicating with the relay node in the service area from the base station to the relay node and thereby restarting a service by the relay node.

To achieve the above object, a method according to one aspect of the invention is a relay node control method in a mobile communication system including a mobile relay node that relays communication between a base station and a mobile station, which includes a duplication determination step of determining whether a situation where a plurality of relay nodes having the same identification information exist in a service area of one base station occurs before the mobile relay node moves from one base station to another and makes an inter-base station handover; an identification information change step of changing identification information of a relay node so that identification information are different from each other when the duplication determination step determines that the situation where a plurality of relay nodes having the same identification information exist in one base station occurs; a handover step of making an inter-base station handover of the relay node that moves from one base station to another after the identification information of the relay node is changed; and a service continuation step of making a handover of a mobile station communicating with a relay node whose identification information is to be changed in the identification information change step in a service area of the relay node from the relay node to a base station and thereby continuing a service for the mobile station by the base station, and, after the identification information of the relay node is changed, making a handover of the mobile station having been communicating with the relay node in the service area from the base station to the relay node and thereby restarting a service by the relay node.

To achieve the above object, a device according to one aspect of the invention is a relay node management device that manages identification information of a mobile relay node that relays communication between a base station and a mobile station, which includes a registration unit for storing identification information in association with a base station and a relay node; a duplication determination unit for determining whether a situation where a plurality of relay nodes having the same identification information exist in a service area of one base station occurs before the mobile relay node moves from one base station to another and makes an inter-base station handover; a change instruction unit for instructing a relay node to change identification information so that identification information are different from each other when the duplication determination unit determines that the situation where a plurality of relay nodes having the same identification information exist occurs; and a permission unit for permitting an inter-base station handover of the mobile relay node upon receiving an identification information change response from the relay node.

To achieve the above object, a method according to one aspect of the invention is a control method of a relay node management device that manages identification information of a mobile relay node that relays communication between a base station and a mobile station, which includes a registration step of storing identification information in association with a base station and a relay node; a duplication determination step of determining whether a situation where a plurality of relay nodes having the same identification information exist in a service area of one base station occurs before the mobile relay node moves from one base station to another and makes an inter-base station handover; a change instruction step of instructing a relay node to change identification information so that identification information are different from each other when the duplication determination step determines that the situation where a plurality of relay nodes having the same identification information exist occurs; and a permission step of permitting an inter-base station handover of the mobile relay node upon receiving an identification information change response from the relay node.

To achieve the above object, a non-transitory computer readable medium storing a program according to one aspect of the invention stores a control program of a relay node management device that manages identification information of a mobile relay node that relays communication between a base station and a mobile station, the program causing a computer to execute a registration step of storing identification information in association with a base station and a relay node; a duplication determination step of determining whether a situation where a plurality of relay nodes having the same identification information exist in a service area of one base station occurs before the mobile relay node moves from one base station to another and makes an inter-base station handover; a change instruction step of instructing a relay node to change identification information so that identification information are different from each other when the duplication determination step determines that the situation where a plurality of relay nodes having the same identification information exist occurs; and a permission step of permitting an inter-base station handover of the mobile relay node upon receiving an identification information change response from the relay node.

Advantageous Effects of Invention

According to the present invention, it is possible to avoid duplication of identification information of relay nodes and continue communication by a mobile station under control of a relay node at the handover of a mobile relay node between base stations.

BRIEF DESCRIPTION OF DRAWINGS

FIG. 1 is a block diagram showing a configuration of a mobile communication system according to a first exemplary embodiment of the invention;

DESCRIPTION OF EMBODIMENTS

Figure 2A:
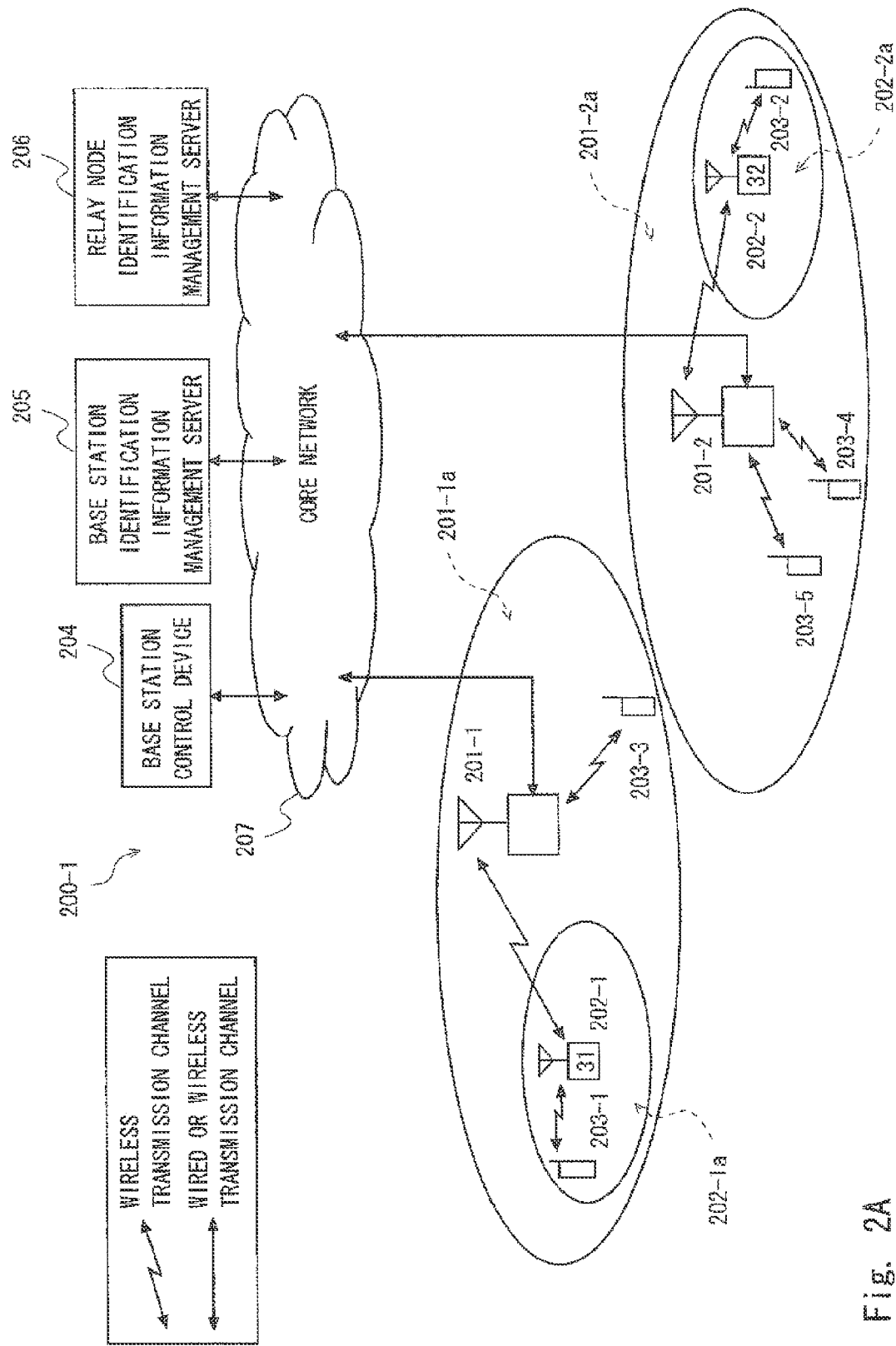
FIG. 2A is a diagram showing a configuration before an inter-base station handover of a relay node in a mobile communication system according to a second exemplary embodiment of the invention.

Exemplary embodiments of the present invention will be described hereinafter in detail by way of illustration with reference to the drawings. The elements described in the following exemplary embodiments are shown by way of illustration only and thus do not limit the scope of the invention.

First Exemplary Embodiment

A mobile communication system 100 according to a first exemplary embodiment of the invention is described hereinafter with reference to FIG. 1. The mobile communication system 100 is a system including a mobile relay node 102 that relays communication between a base station 101 and a mobile station 103.

As shown in FIG. 1, the mobile communication system 100 includes a duplication determination unit 110, an identification information change unit 120, a handover unit 130, and a service continuation unit 140. The duplication determination unit 110 determines whether a situation where a plurality of relay nodes having the same identification information exist in the service area of one base station will occur or not before a mobile relay node 102a moves from one base station to another and makes an inter-base station handover. When the duplication determination unit 110 determines that the situation where a plurality of relay nodes having the same identification information exist in one base station will occur, the identification information change unit 120 changes the identification information of the relay node 102 so that the identification information are different from each other. The handover unit 130 carries out the inter-base station handover of a relay node that moves from one base station to another after the identification information of the relay node is changed. The service continuation unit 140 makes a handover of the mobile station 103 that is located in the service area of the relay node whose identification information is to be changed by the identification information change unit 120 and communicating with the relay node from the relay node to the base station and thereby continues a service for the mobile station by the base station. Then, after the identification information of the relay node is changed, a handover of the mobile station that has been communicating with the relay node in the service area is made from the base station to the relay node, thereby restarting the service by the relay node.

According to this exemplary embodiment, it is possible to avoid duplication of identification information of relay nodes and continue communication by a mobile station under control of a relay node at the handover of the mobile relay node between base stations.

Second Exemplary Embodiment

A mobile communication system according to a second exemplary embodiment of the invention is described hereinafter. In this exemplary embodiment, a relay node identification information management method and a handover processing method in the case where a mobile relay node moves from one base station to another and makes a handover are described. Particularly, the relay node identification information management method and the handover processing method that avoid the occurrence of a situation where a plurality of relay nodes having the same identification information exist in the service area of one base station due to the handover. Note that the handover in this exemplary embodiment is preferably a soft handover. According to this exemplary embodiment, at the inter-base station handover of a mobile relay node, it is possible to continue communication by a mobile station under control of the relay node even when identification information of one relay node is changed to avoid duplication of identification information of relay nodes.
<Basic Technology of Mobile Communication System>

First, the current technological level related to the mobile communication system according to this exemplary embodiment is schematically described.

In LTE-Advanced (Long Term Evolution-Advanced), a relay node (RN: Relay Node) having a radio relay function, particularly a Type 1 relay node that relays Layer 3 information, is specified for the purpose of expanding the coverage area of a base station (eNB: enhanced Node B) and eliminating the blind zone (cf. 3GPP TR36.814 (v9.0.0) and 3GPP TS 36.216 (v10.1.0)). The Type 1 relay node has a cell ID like a base station, and it performs signal transmission and reception with a mobile station (UE: User Equipment) in the same manner as the base station and performs communication with a base station (Donor eNB) to which it connects by using the transmitting and receiving frequency band of the base station as it is. The frequency band of a signal from the Type 1 relay node to the mobile station and the frequency band of a signal from the base station to the Type 1 relay node are the same, and the frequency band of a signal from the mobile station to the Type 1 relay node and the frequency band of a signal from the Type 1 relay node to the base station are the same. In the system where the Type 1 relay node operates, signals with the same frequency band are handled in a time-sharing fashion in principle. The time sharing control (scheduling) is made in the base station. Note that, as variations of the Type 1 relay node, a Type 1a relay node that uses different frequency bands for a signal from the relay node to the mobile station and a signal from the base station to the relay node, or a signal from the mobile station to the relay node and a signal from the relay node to the base station, and a Type 1b relay node that uses the same frequency band but does not need to handle signals in a time-sharing fashion by establishing a spatial isolation are specified.

This exemplary embodiment may be applied also to the Type 1a relay node and the Type 1b relay node. Hereinafter, those nodes are simply referred to as "the Type 1 relay node" or just "relay node" without distinguishing between them. At 3GPP RAN meeting (RAN1#60, February 2010), it is agreed that only a stationary relay node is taken into consideration as the Type 1 relay node at the beginning of implementation, in Release 10, of LTE-Advanced. The stationary relay node is literally a relay node that does not move after it is installed in principle. On the other hand, it is essential in the future to implement a mobile relay node that is installed in a bus, train or the like and thereby accommodates mobile stations in those vehicles, and consequently, a situation where the stationary relay node and the mobile relay node coexist in the same cell, that is, they are connected to the same base station, could occur. Note that the stationary relay node may be the one initially used (at the time of Release 10) or the one created after introduction of the mobile relay node. In the mobile relay node, functions and control in accordance with movement, such as when a base station to be connected changes by movement, are added and thereby the circuit is larger in size and more complicated compared with the stationary relay node, and therefore there is a possibility that a relay node with less size increase and complication is created by limiting use to the stationary relay node even after the mobile relay node is introduced.

Further, in the assignment of identification information to a relay node, one approach is to avoid duplication of identification information among all mobile relay nodes in the system, if feasible. However, assigning identification information to avoid duplication among all mobile relay nodes in the system requires an enormous number of mobile relay node identification information to be prepared. On the other hand, when mobile relay nodes are at a sufficient distance from each other, assignment of the same mobile relay node identification information causes no effect on the cell search or the like of mobile stations. It is therefore practical to assign mobile relay node identification information to avoid duplication between nearby relay nodes.
<Configuration of Mobile Communication System when there is No Duplication of Identification Information>

Figure 2B:
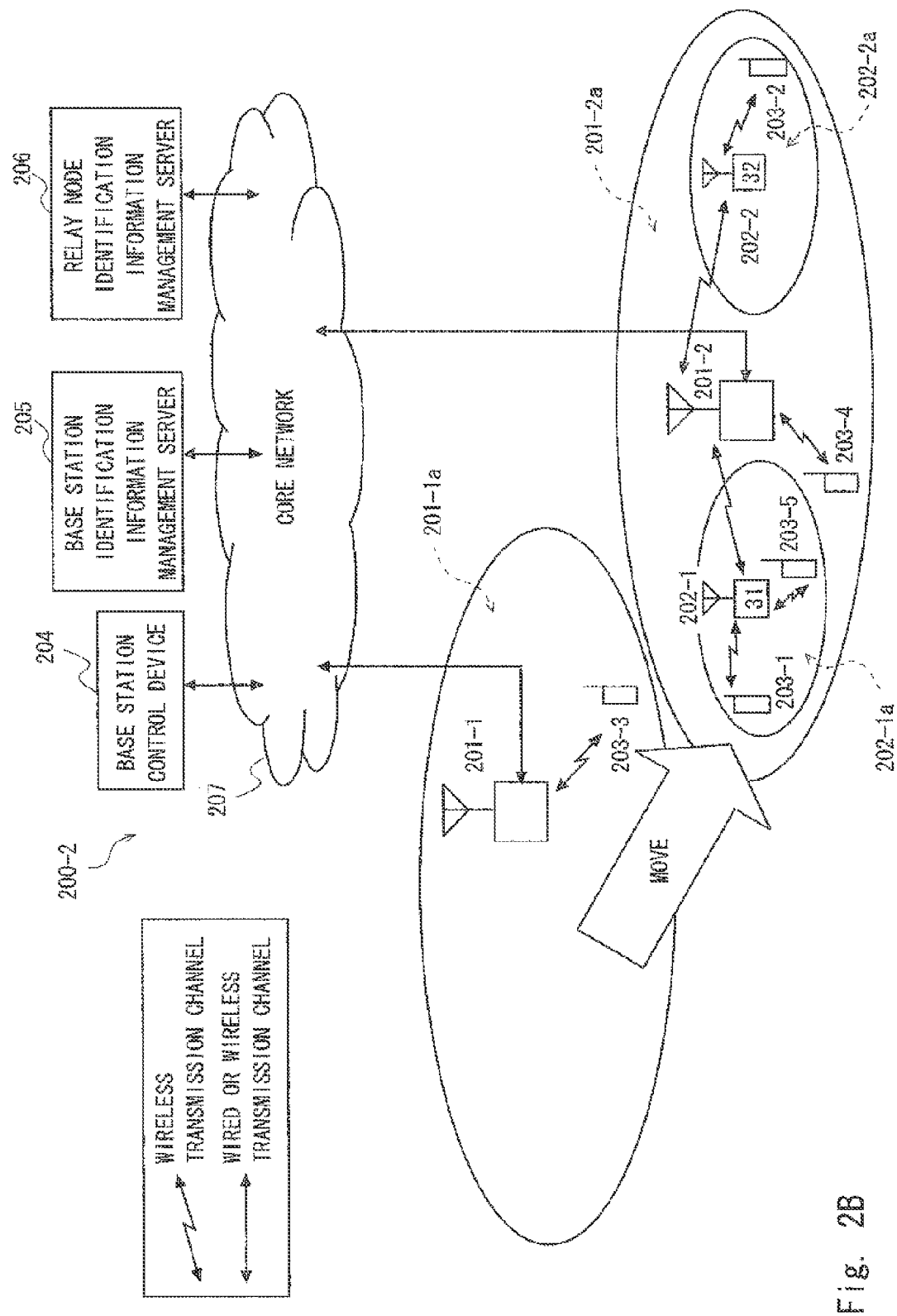
FIG. 2B is a diagram showing a configuration after an inter-base station handover of a relay node in the mobile communication system according to the second exemplary embodiment of the invention.

The configuration of the mobile communication system according to this exemplary embodiment is described. FIGS. 2A and 2B show examples of the inter-base station handover of a mobile relay node in the LTE mobile communication system. FIG. 2B shows the state where a certain time has elapsed from FIG. 2A, and a mobile relay node 202-1 has moved from a service area (cell) 201-1*a* by one base station 201-1 to a service area (cell) 201-2*a* by another base station 201-2. First, the case where duplication of identification information does not occur by the inter-base station handover of the mobile relay node 202-1 is described.

(Configuration Before Inter-Base Station Handover of Relay Node)

FIG. 2A is a diagram showing a configuration before the inter-base station handover of a relay node in the mobile communication system according to this exemplary embodiment.

FIG. 2A shows base stations 201-1 and 201-2, mobile relay nodes 202-1 and 202-2, mobile stations 203-1 to 203-5, a base station control device 204, a base station identification information management server 205, and a relay node identification information management server 206. Further, a service area (cell) 201-1*a* by the base station 201-1, a service area (cell) 201-2*a* by the base station 201-2, a service area (cell) 202-1*a* by the mobile relay node 202-1, a service area (cell) 202-2*a* by the mobile relay node 202-2, and a core network 207 are shown. Furthermore, identification information that is assigned to each of the mobile relay nodes 202-1 and 202-2 is shown. Specifically, the identification information of the mobile relay node 202-1 is "31", and the identification information of the mobile relay node 202-2 is "32". Thus, in FIG. 2A, even when the mobile relay nodes 202-1 and 202-2 make an inter-base station handover to another base station, the identification information of the mobile relay nodes do not duplicate each other.

The base station 201-1 forms the service area (cell) 201-1*a* and communicates with the mobile station 203-3 and the mobile relay node 202-1 in the cell through a radio channel. Further, the base station 201-1 communicates also with the base station control device 204 and the base station identification information management server 205 through the core network 207. The channel of communication through the core network 207 may be a wired or wireless channel. Likewise, the base station 201-2 forms the service area (cell) 201-2*a* and communicates with the mobile stations 203-4 and 203-5 and the mobile relay node 202-2 in the cell through a radio channel. Further, the base station 201-2 communicates also with the base station control device 204 and the base station identification information management server 205 through the core network 207. The channel of communication through the core network 207 may be a wired or wireless channel. The base station control device 204 controls the base station, the stationary relay node (through the base station) and the mobile relay node (through the base station). Note that there is a case where different base station control devices are used for different base stations, which is the case where a plurality of base station control devices exist. The base station identification information management server 205 manages base station identification information.

The relay node identification information management server 206, which is a relay node control unit, is connected to the mobile relay nodes 202-1 and 202-2 through the core network 207 and each base station. The relay node identification information management server 206 manages relay node identification information of a mobile relay node and a stationary relay node. The mobile relay node 202-1 forms the service area (cell) 202-1*a* and communicates with the mobile station 203-1 in the cell. Further, the mobile relay node 202-1 transmits Layer 3 information of a received signal from the mobile station 203-1 to the base station 201-1. Furthermore, the mobile relay node 202-1 receives a signal from the base station 201-1, acquires Layer 3 information addressed to the mobile station 203-1, converts it into Layer 1 information, adds control information or the like thereto, and transmits it to the mobile station 203-1. All of those communications are performed through a wireless channel. Likewise, the mobile relay node 202-2 forms the service area (cell) 202-2*a* and communicates with the mobile station 203-2 in the cell. Further, the mobile relay node 202-2 transmits Layer 3 information of a received signal from the mobile station 203-2 to the base station 201-2. Furthermore, the mobile relay node 202-2 receives a signal from the base station 201-2, acquires Layer 3 information addressed to the mobile station 203-2, converts it into Layer 1 information, adds control information or the like thereto, and transmits it to the mobile station 203-2. All of those communications are performed through a wireless channel. In such an example, a predetermined number of mobile relay node identification information are prepared specially for mobile relay nodes and managed in the relay node identification information management server 206.

(Configuration After Inter-Base Station Handover of Relay Node)

FIG. 2B is a diagram showing a configuration after the inter-base station handover of a relay node in the mobile communication system according to this exemplary embodiment.

FIG. 2B shows the state where a certain time has elapsed from FIG. 2A, and the mobile relay node 202-1 has moved from the service area (cell) 201-1*a* by the base station 201-1 to the service area (cell) 201-2*a* by the base station 201-2. Accordingly, a base station to which the mobile relay node 202-1 is connected is changed from the base station 201-1 to the base station 201-2, that is, an inter-base station handover is carried out. In FIG. 2B, duplication of mobile relay node identification information does not occur. Therefore, the mobile relay node identification information of the mobile relay node 202-1 before the inter-base station handover is notified from the base station 201-1 from which the inter-base station handover is made to the base station 201-2 to which the inter-base station handover is made through the base station control device 204. The inter-base station handover of the mobile relay node 202-1 can be thereby made, allowing the mobile station 203-1 under control of the mobile relay node 202-1 to continue communication. The notification of identification information in such a handover can be made through the route of the base station 201-1→the base station identification information management server 205→the base station 201-2. Further, it can be made through the route of the relay node identification information management server 206→the base station identification information management server 205→the base station 201-2, and the route is not particularly limited.

An example of a procedure to transmit and receive messages in the inter-base station handover of the mobile relay node 202-1 in FIG. 2B is described in detail later with reference to FIG. 4.

<Operation Procedure of Relay Node of Mobile Communication System when there is No Duplication of Identification Information>

An operation procedure in the case where there is no duplication of identification information in the mobile communication system according to this exemplary embodiment is described hereinbelow.

<Connection Procedure of Relay Node>

Figure 3:
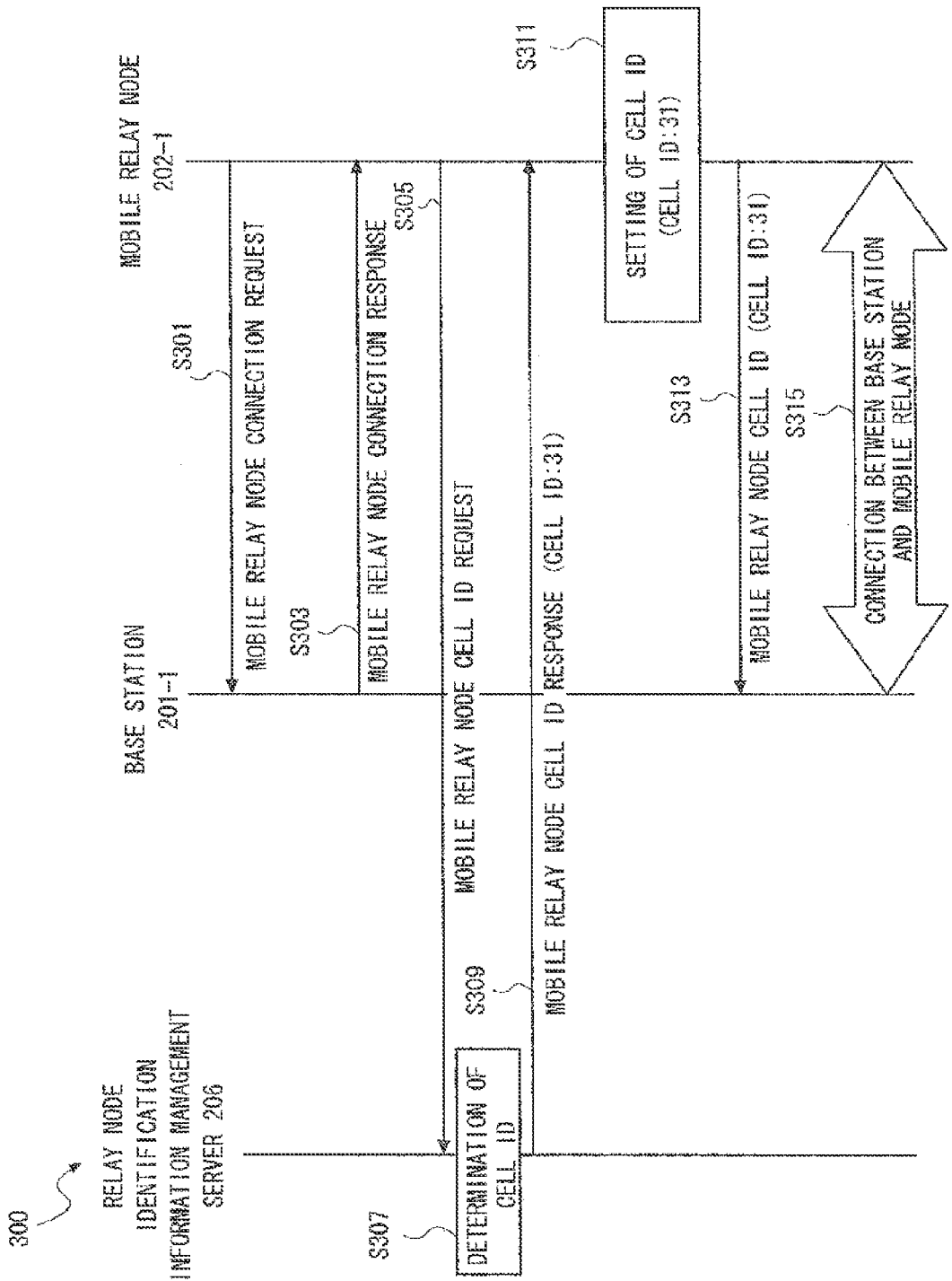
FIG. 3 is a sequence chart showing a connection procedure of a relay node in the mobile communication system according to the second exemplary embodiment of the invention.

FIG. 3 is a sequence chart showing a connection procedure 300 of a relay node in the mobile communication system according to this exemplary embodiment. FIG. 3 shows the relay node identification information management server 206, the base station 201-1 and the mobile relay node 202-1. It is assumed that mobile relay node cell IDs for mobile relay nodes are "31", "32" and "33". Note that the connection procedure of the mobile relay node 202-2 and other relay nodes is the same and not redundantly described.

At the initial connection, in Step S301, the mobile relay node 202-1 transmits "mobile relay node connection request" to the base station 201-1 to which it desires to connect. Note that, although the mobile relay node 202-1 needs to establish a connection with the base station 201-1 as a mobile station previously, those steps including the subsequent steps are not described (see 3GPP TS 36.300 (v10.2.0) for details). Receiving the "mobile relay node connection request", the base station 201-1 transmits "mobile relay node connection response" to the mobile relay node 202-1 in Step S303, so that a connection as a mobile relay node is established. After that, in Step S305, the mobile relay node 202-1 transmits "mobile relay node cell ID request" to the relay node identification information management server 206 through the base station 201-1. Receiving the "mobile relay node cell ID request", the relay node identification information management server 206 transmits a mobile relay node cell ID (which is "31" in this example) that does not duplicate the mobile relay node cell IDs of at least nearby mobile relay nodes as "mobile relay node cell ID response" to the mobile relay node 202-1 through the base station 201-1 in Step S309. Receiving the "mobile relay node cell ID response", the mobile relay node 202-1 makes setting as a mobile relay node in Step S311 and notifies "mobile relay node cell ID" to the base station 201-1 in Step S313. After that, as in Step S315, the mobile relay node 202-1 operates as a mobile relay node in the service area (cell) 201-1a of the base station 201-1.

(Inter-Base Station Handover Procedure)

Figure 4:
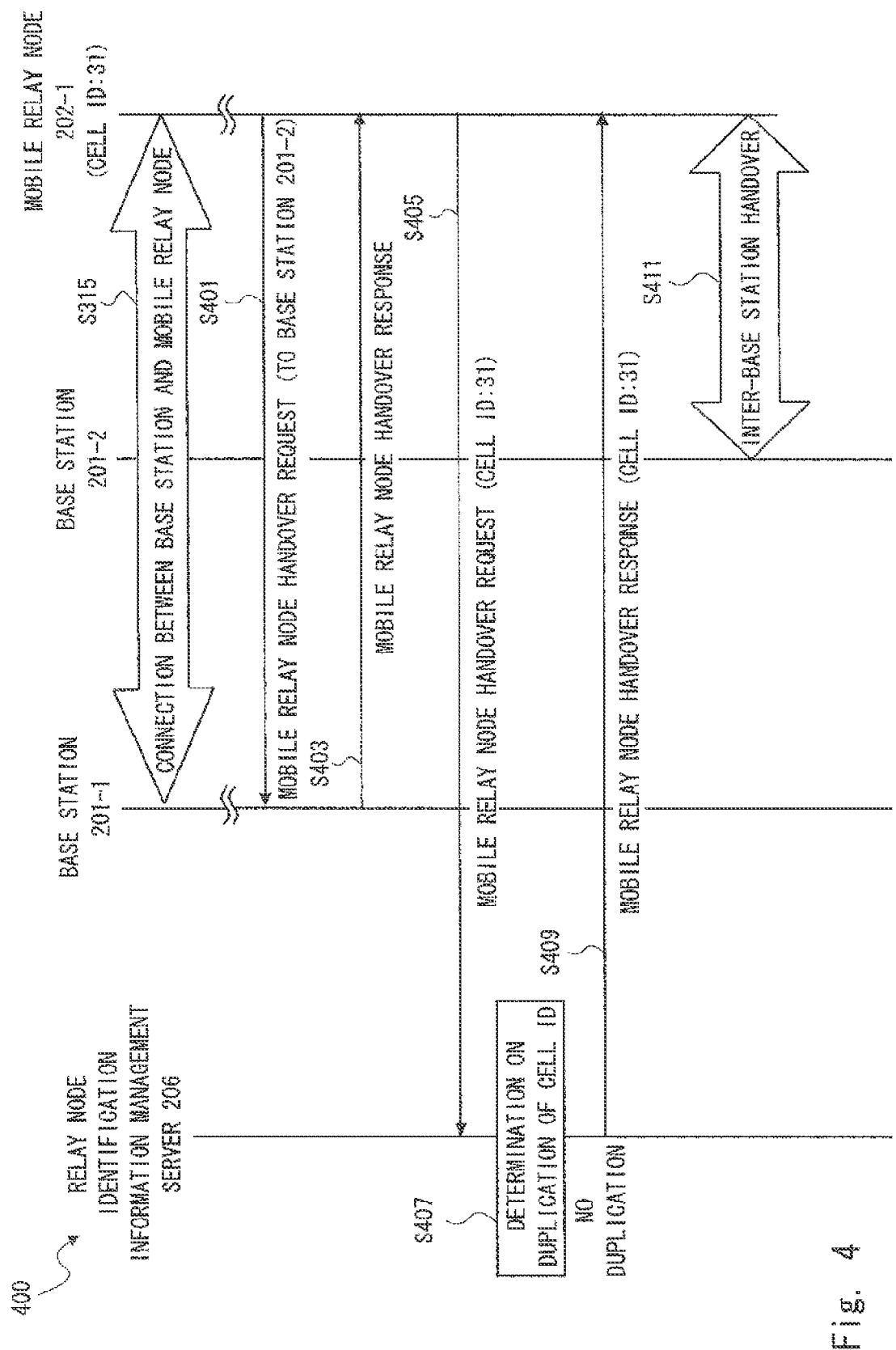
FIG. 4 is a sequence chart showing an inter-base station handover procedure of a relay node in the case where there is no duplication of identification information in the mobile communication system according to the second exemplary embodiment of the invention.

FIG. 4 is a sequence chart showing an inter-base station handover procedure 400 of a relay node in the case where there is no duplication of identification information in the mobile communication system according to this exemplary embodiment. FIG. 4 shows the relay node identification information management server 206, the base stations 201-1 and 201-2, and the mobile relay node 202-1. It is assumed that mobile relay node cell IDs for mobile relay nodes are "31", "32" and "33". Further, the mobile relay node 202-1 is being connected to the base station 201-1, and the mobile relay node cell ID is "31".

At the inter-base station handover, in Step S401, the mobile relay node 202-1 transmits "mobile relay node handover request" containing a desired inter-base station handover destination (which is the base station 201-2 in this example) to the base station 201-1 to which it is being connected. Receiving the "mobile relay node handover request", the base station 201-1 transmits "mobile relay node handover response" to the mobile relay node 202-1 in Step S403. The base station 201-1 then starts making preparations for the inter-base station handover. Note that the preparations for the inter-base station handover which are made by the base station 201-1 include exchange of messages for taking over the information of the mobile relay node 202-1 to the base station 201-2.

After that, the mobile relay node 202-1 transmits "mobile relay node handover request" to the relay node identification information management server 206 through the base station 201-1 in Step S405. Receiving the "mobile relay node handover request", the relay node identification information management server 206 determines whether the mobile relay node cell ID (which is "31" in this example) of the mobile relay node 202-1 duplicates the mobile relay node cell IDs of at least nearby mobile relay nodes in Step S407.

Because there is no duplication in this example, the relay node identification information management server 206 transmits "mobile relay node handover response" to the mobile relay node 202-1 through the base station 201-1 in Step S409. Receiving the mobile relay node handover response", the mobile relay node 202-1 carries out the inter-base station handover from the base station 201-1 to the base station 201-2, with the mobile relay node cell ID remaining "31", in Step S411. After that, the mobile relay node 202-1 connects to the base station 201-2 and the mobile relay node cell ID remains "31".

<Configuration of Mobile Communication System when there is Duplication of Identification Information>

Next, the case where duplication of identification information occurs by the inter-base station handover is described. For example, when the mobile relay node 202-1 moves farther than the nearby range, there is a possibility that duplication of mobile relay node identification information occurs. Particularly, it is likely to occur for a mobile relay node on a train, a long distance coach or the like. Therefore, control for eliminating duplication of mobile relay node identification information is performed in the relay node identification information management server 206. Specifically, the mobile relay node identification information of either one mobile relay node (which is likely to duplicate) is changed prior to the inter-base station handover that causes the occurrence of duplication of mobile relay node identification information in the vicinity. At this time, the mobile relay node whose mobile relay node identification information is to be changed performs control to make a temporary inter-cell handover of all mobile stations under its control to the base station to which the mobile relay node is being connected. The mobile relay node whose mobile relay node identification information is to be changed or the base station to which the inter-cell handover is made performs control to let the mobile stations for which the temporary inter-cell handover has been made back under control of the mobile relay node.

Figure 5A:
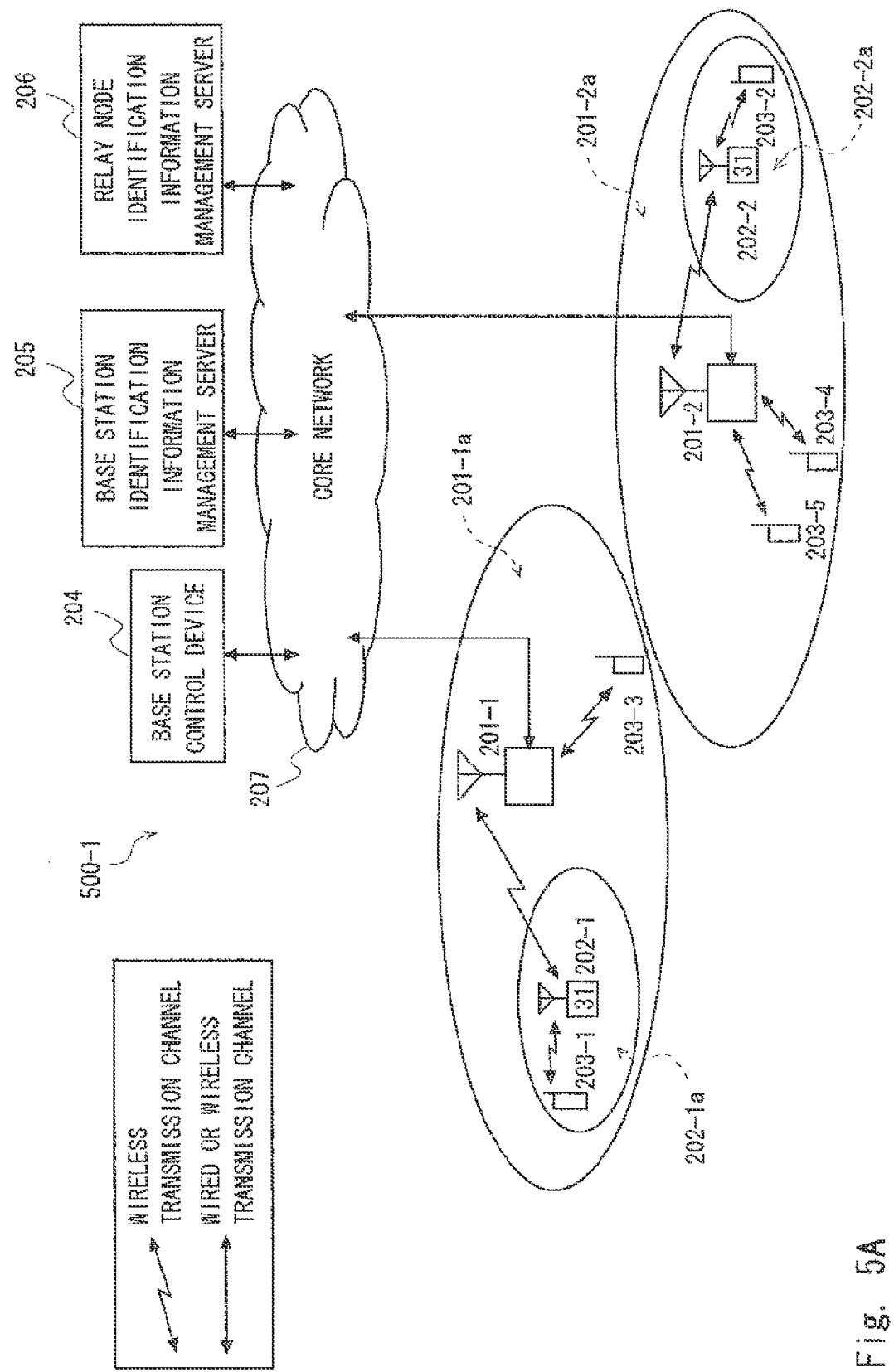
FIG. 5A is a diagram showing a configuration before an inter-base station handover of a relay node in the mobile communication system according to the second exemplary embodiment of the invention.
Figure 5B:
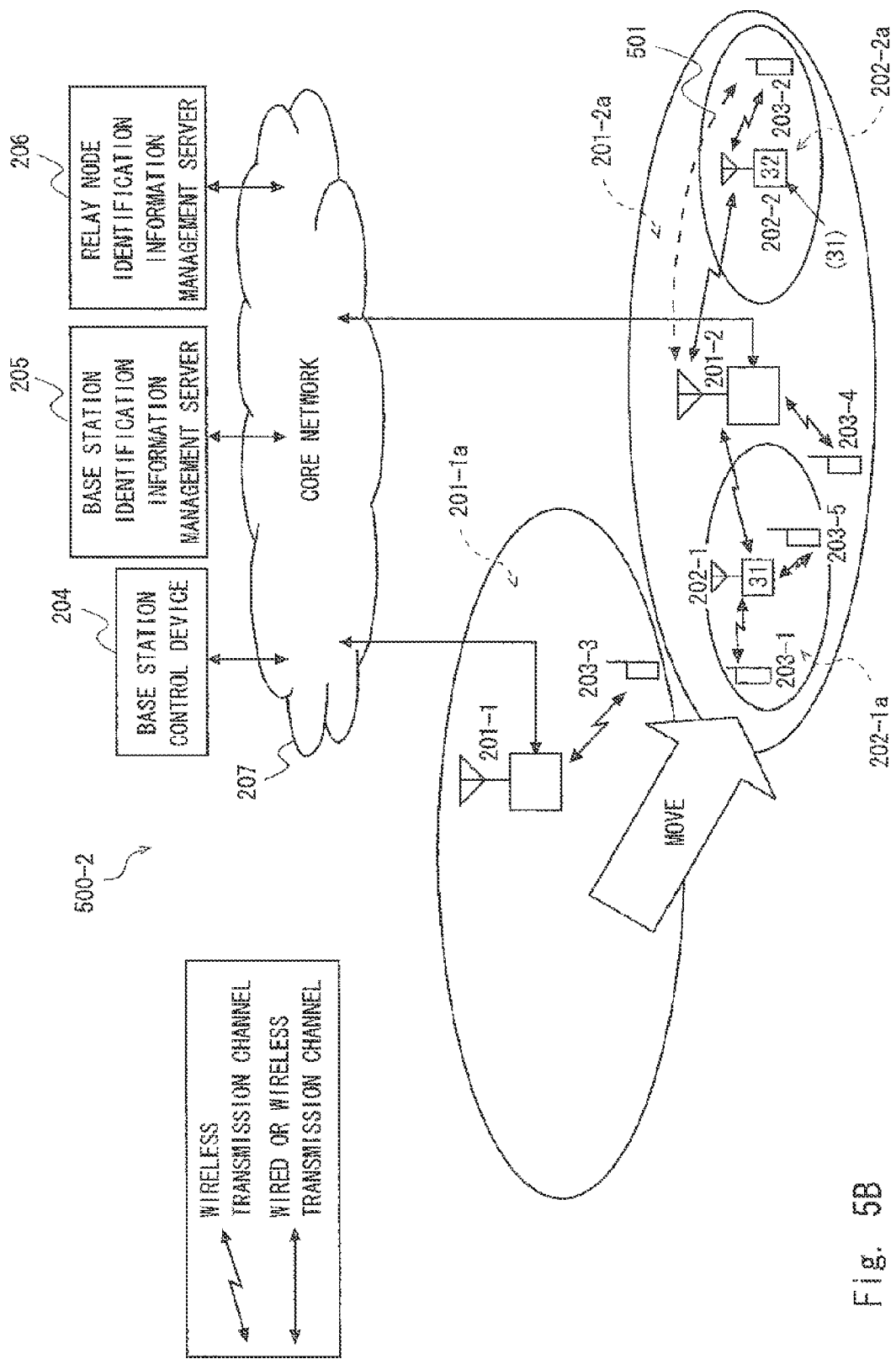
FIG. 5B is a diagram showing a configuration after an inter-base station handover of a relay node in the mobile communication system according to the second exemplary embodiment of the invention.

The criteria and method for selecting which mobile relay node to change the mobile relay node identification information are not limited. Examples of the criteria include the higher reception quality of a temporary inter-cell handover destination, the lower movement speed of a mobile relay node, the smaller number of mobile stations under its control, and the smaller total amount of communication data with a base station being connected. In general, it is common to change the mobile relay node identification information of the other mobile relay node that is different from the mobile relay node that intends to make the inter-base station handover. FIGS. 5A and 5B show the case of changing the mobile relay node identification information of the other mobile relay node that is different from the mobile relay node that intends to make the inter-base station handover.

(Configuration Before Inter-Base Station Handover of Relay Node)

FIG. 5A is a diagram showing a configuration before the inter-base station handover of a relay node in the mobile communication system according to this exemplary embodiment. FIG. 5A is different from FIG. 2A in that the mobile relay node cell ID of the mobile relay node 202-2 is "31", which is the same as the mobile relay node cell "31" of the mobile relay node 202-1 that intends to make the inter-base station handover. The other elements are the same as those of FIG. 2A and therefore denoted by the same reference numerals and not redundantly described.

(Configuration After Inter-Base Station Handover of Relay Node)

FIG. 5B is a diagram showing a configuration after the inter-base station handover of a relay node in the mobile communication system according to this exemplary embodiment.

In FIG. 5B, before the mobile relay node 202-1 makes the inter-base station handover, the mobile relay node cell ID of the mobile relay node 202-2 is changed from "31" to "32" in order to avoid duplication of the mobile relay node identification information. However, when the mobile relay node cell ID is changed while the mobile relay node 202-2 is moving, communication of the mobile station 203-2 under its control is interrupted during that time. Therefore, as indicated by 501 in FIG. 5B, the mobile station 203-2 is made to directly communicate with the base station 201-2 temporarily by the inter-cell handover. After that, the mobile relay node cell ID of the mobile relay node 202-2 is changed to "32", and this change is notified to the base station 201-2 and the relay node identification information management server 206. Then, the mobile relay node 202-2 makes the mobile station 203-2 back under its control by the inter-cell handover from the base station 201-2. During this time, the mobile station 203-2 can continue communication without interruption.

At the inter-base station handover, the mobile relay node identification information of the mobile relay node 202-1 before the inter-base station handover is notified from the base station 201-1 from which the inter-base station handover is made to the base station 201-2 to which the inter-base station handover is made through the base station control device 204. Further, the notification can be made through the route of the base station 201-1→the base station identification information management server 205→the base station 201-2 or the route of the relay node identification information management server 206→the base station identification information management server 205→the base station 201-2, and the route is not particularly limited.

Note that the other elements of FIG. 5B are the same as those of FIG. 2B and therefore denoted by the same reference numerals and not redundantly described. Further, the message transmitting and receiving procedure of this example is described in detail later with reference to FIG. 7. Further, there is no limit to the number of mobile relay node identification information.

According to this exemplary embodiment, at the inter-base station handover of a mobile relay node, if the mobile relay node identification information of the mobile relay node that makes the inter-base station handover duplicates the mobile relay node identification information of at least nearby mobile relay nodes, the inter-base station handover can be carried out after eliminating the duplication. It is thereby possible to carry out the inter-base station handover, allowing the mobile relay node identification information of the mobile relay node that makes the inter-base station handover to remain the same.

<Operation Procedure of Mobile Communication System when there is Duplication of Identification Information>

Figure 6:
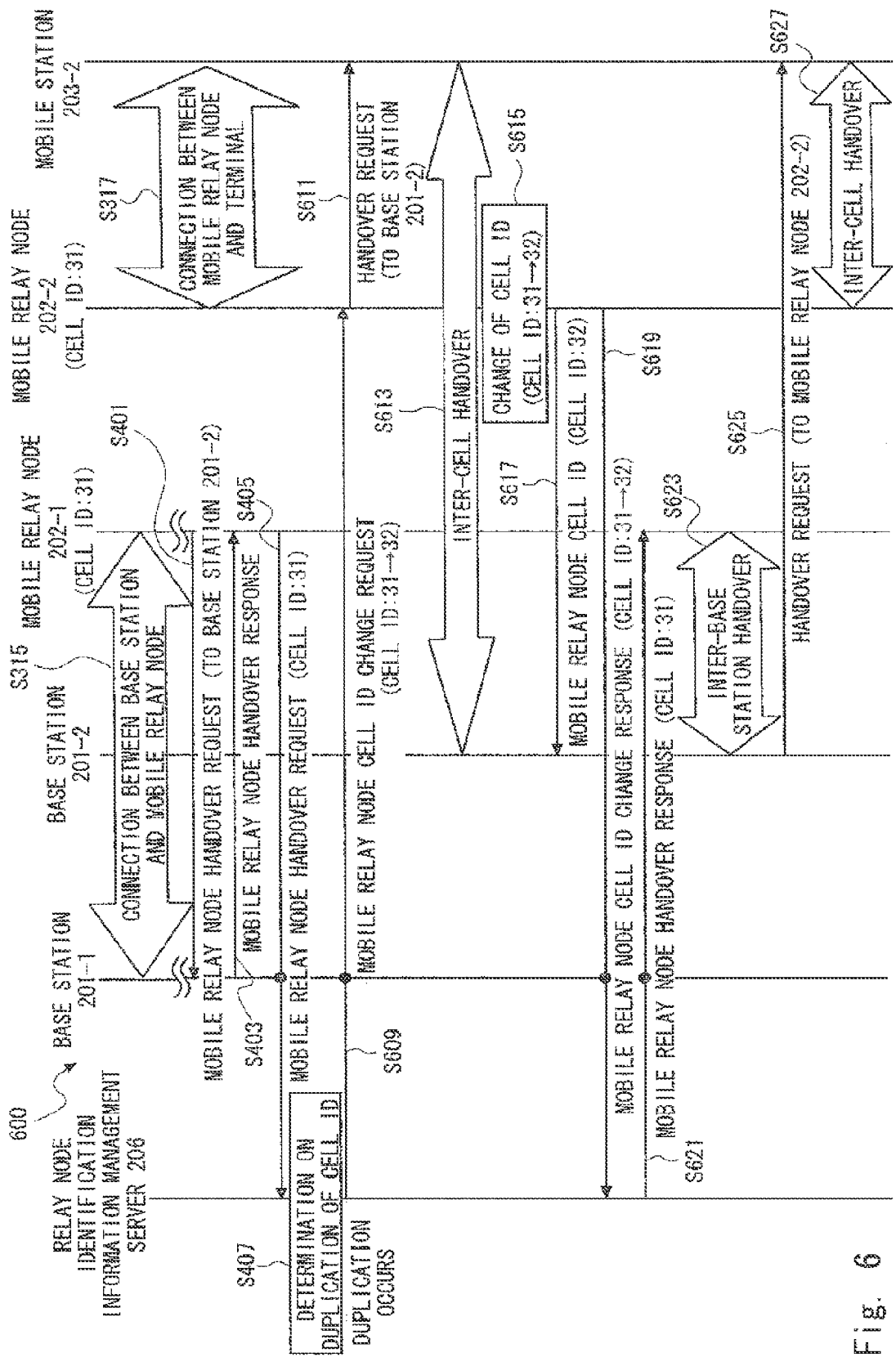
FIG. 6 is a sequence chart showing the inter-base station handover procedure of a relay node in the case where there is duplication of identification information in the mobile communication system according to the second exemplary embodiment of the invention.

FIG. 6 is a sequence chart showing an inter-base station handover procedure 600 of a relay node in the case where there is duplication of identification information in the mobile communication system according to this exemplary embodiment. FIG. 6 shows the relay node identification information management server 206, the base stations 201-1 and 201-2, the mobile relay nodes 202-1 and 202-2, and the mobile station 203-2. It is assumed that mobile relay node cell IDs for mobile relay nodes are "31", "32" and "33". Further, the mobile relay node 202-1 is being connected to the base station 201-1, and the mobile relay node cell ID is "31". On the other hand, the mobile relay node 202-2 is being connected to the base station 201-2, and the mobile relay node cell ID is "31". The mobile station 203-2 is being connected to the mobile relay node 202-2. Note that the same steps as in FIG. 4 are denoted by the same reference numerals.

At the inter-base station handover, in Step S401, the mobile relay node 202-1 transmits "mobile relay node handover request" containing a desired inter-base station handover destination (which is the base station 201-2 in this example) to the base station 201-1 to which it is being connected. Receiving the "mobile relay node handover request", the base station 201-1 transmits "mobile relay node handover response" to the mobile relay node 202-1 in Step S403. The base station 201-1 then starts making preparations for the inter-base station handover.

After that, the mobile relay node 202-1 transmits "mobile relay node handover request" to the relay node identification information management server 206 through the base station 201-1 in Step S405. Receiving the "mobile relay node handover request", the relay node identification information management server 206 determines whether the mobile relay node cell ID (which is "31" in this example) of the mobile relay node 202-1 duplicates the mobile relay node cell IDs of at least nearby mobile relay nodes in Step S407.

Because there is duplication in this example, the relay node identification information management server 206 transmits "mobile relay node cell ID change request" to one of the mobile relay nodes having duplicate IDs (which is the mobile relay node 202-2 in this example) in Step S609. In this step, the relay node identification information management server 206 transmits a mobile relay node cell ID (which is "32" in this example) that does not duplicate the mobile relay node cell IDs of at least nearby mobile relay nodes as the mobile relay node cell ID after change, as "mobile relay node cell ID change request". Receiving the "mobile relay node cell ID change request", the mobile relay node 202-2 transmits "handover request" indicating the inter-cell handover to the base station to which the mobile relay node 202-2 is being connected (which is the base station 201-2 in this example) to all mobile stations under its control including the mobile station 203-2 in Step S611. Receiving the "handover request", all the mobile stations including the mobile station 203-2 under control of the mobile relay node 202-2 make the inter-cell handover to the base station 201-2 in Step S613.

In this step, in order to ensure that all the mobile stations including the mobile station 203-2 under control of the mobile relay node 202-2 make the inter-cell handover from the mobile relay node 202-2 to the base station 201-2, the transmission power of each common signal of the mobile relay node 202-2 is controlled. Specifically, the transmission power of each common signal at the inter-cell handover may be set lower than the previous level.

The mobile relay node 202-2 that no longer has mobile stations under its control changes its mobile relay node cell ID (from "31" to "32" in this example) in Step S615. Then, in Step S617, the mobile relay node 202-2 notifies the new mobile relay node cell ID (which is "32" in this example) as "mobile relay node cell ID" to the base station 201-2. Further, the mobile relay node 202-2 notifies the success of cell ID change as "mobile relay node cell ID change response" to the relay node identification information management server 206 in Step S619. Receiving the "mobile relay node cell ID change response", the relay node identification information management server 206 recognizes that duplication of the cell ID has been eliminated and updates the mobile relay node identification information which it manages. Further, in Step S621, the relay node identification information management server 206 transmits "mobile relay node handover response" that permits the inter-base station handover to the mobile relay node 202-1 which has transmitted the "mobile relay node handover request" through the base station 201-1.

Receiving the "mobile relay node handover response", the mobile relay node 202-1 carries out the inter-base station handover from the base station 201-1 to the base station 201-2, with the mobile relay node cell ID remaining the same in Step S623. After that, the mobile relay node 202-1 connects to the base station 201-2 and the mobile relay node cell ID remains "31".

On the other hand, after the base station 201-2 receives the new mobile relay node cell ID (which is "32" in this example) of the mobile relay node 202-2 as the "mobile relay node cell ID", the base station 201-2 transmits "handover request" indicating the inter-cell handover to the mobile relay node 202-2 to all the mobile stations including the mobile station 203-2 that have been under control of the mobile relay node 202-2 before the change of the mobile relay node cell ID of the mobile relay node 202-2 in Step S625. Receiving the "handover request", all the mobile stations including the mobile station 203-2 that have been under control of the mobile relay node 202-2 before the change of the mobile relay node cell ID of the mobile relay node 202-2 make the inter-cell handover from the base station 201-2 to the mobile relay node 202-2 in Step S627, thereby restarting the service.

In this step, in order to ensure that all the mobile stations including the mobile station 203-2 that have been under control of the mobile relay node 202-2 before the change of the mobile relay node cell ID of the mobile relay node 202-2 make the inter-cell handover from the base station 201-2 to the mobile relay node 202-2, the transmission power of each common signal of the mobile relay node 202-2 is controlled. Specifically, the transmission power of each common signal before the inter-cell handover prior to the change of the mobile relay node cell ID may be stored in the mobile relay node 202-2, and each common signal is transmitted at the same or slightly higher transmission power than the stored transmission power.

Note that either of the inter-base station handover of the mobile relay node 202-1 and the inter-cell handover of all the mobile stations including the mobile station 203-2 that have been under control of the mobile relay node 202-2 before the change of the mobile relay node cell ID of the mobile relay node 202-2 from the base station 201-2 to the mobile relay node 202-2 may be performed first. In this exemplary embodiment, the mobile relay node identification information is not particularly limited. For example, it may be a cell ID, information about the timing of transmission and reception, information about the channel quality, information about the traffic amount, the movement speed of the mobile relay node or the like.

<Hardware Configuration of Relay Node Identification Information Management Server>

Figure 7:
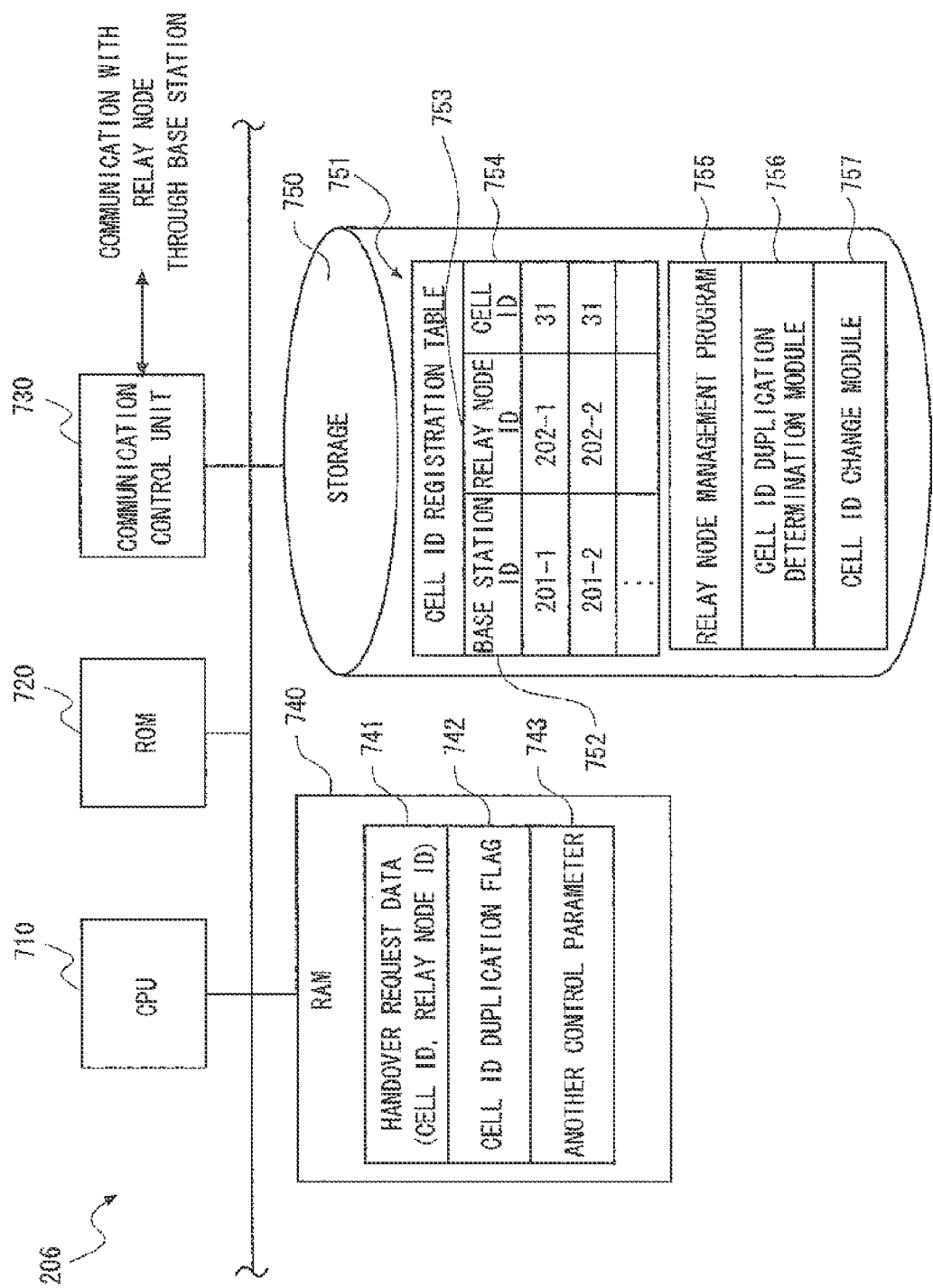
FIG. 7 is a block diagram showing a hardware configuration of a relay node identification information management server according to the second exemplary embodiment of the invention.

FIG. 7 is a block diagram showing a hardware configuration of the relay node identification information management server 206 according to this exemplary embodiment. Note that only the elements related to this exemplary embodiment are shown in FIG. 7.

In FIG. 7, a CPU 710 is an arithmetic control processor and implements the functional elements of FIG. 2 by executing a program. A ROM 720 stores fixed data and program such as initial data and program. A communication control unit 730 is a control unit for communicating with a relay node through a network and a base station. The communication may be wired or wireless.

A RAM 740 is a random access memory that is used as a temporary storage work area by the CPU 710. The RAM 740 has an area to store data required for implementation of this exemplary embodiment. Specifically, the reference numeral 741 indicates handover request data containing a cell ID and a relay node ID received from a relay node. The reference numeral 742 indicates a cell ID duplication flag indicating whether duplication of cell ID occurs by an inter-base station handover in accordance with the handover request data 741. The reference numeral 743 indicates other control parameters.

A storage 750 stores database, various parameters, and the following data and programs required for implementation of this exemplary embodiment. The reference numeral 751 indicates a cell ID registration table, which is identification information registration unit in which an assigned cell ID 754 is stored in association with a base station ID 752 and a relay node ID 753. In FIG. 7, the cell ID registration table 751 in the situation of FIG. 5A is shown. The storage 750 stores the following programs. The reference numeral 755 indicates a relay node management program for the relay node identification information management server 206 to manage the relay nodes. The reference numeral 756 indicates a cell ID duplication determination module that is contained in the relay node management program 755 and determines duplication of cell IDs (see FIG. 8). The reference numeral 757 indicates a cell ID change module that is contained in the relay node management program 755 and changes the cell ID of a relay node (see FIG. 8).

Note that only the data and program required for this exemplary embodiment are shown in FIG. 7, and general-purpose data and program such as OS are not shown.

<Processing Procedure of Relay Node Identification Information Management Server>

Figure 8:
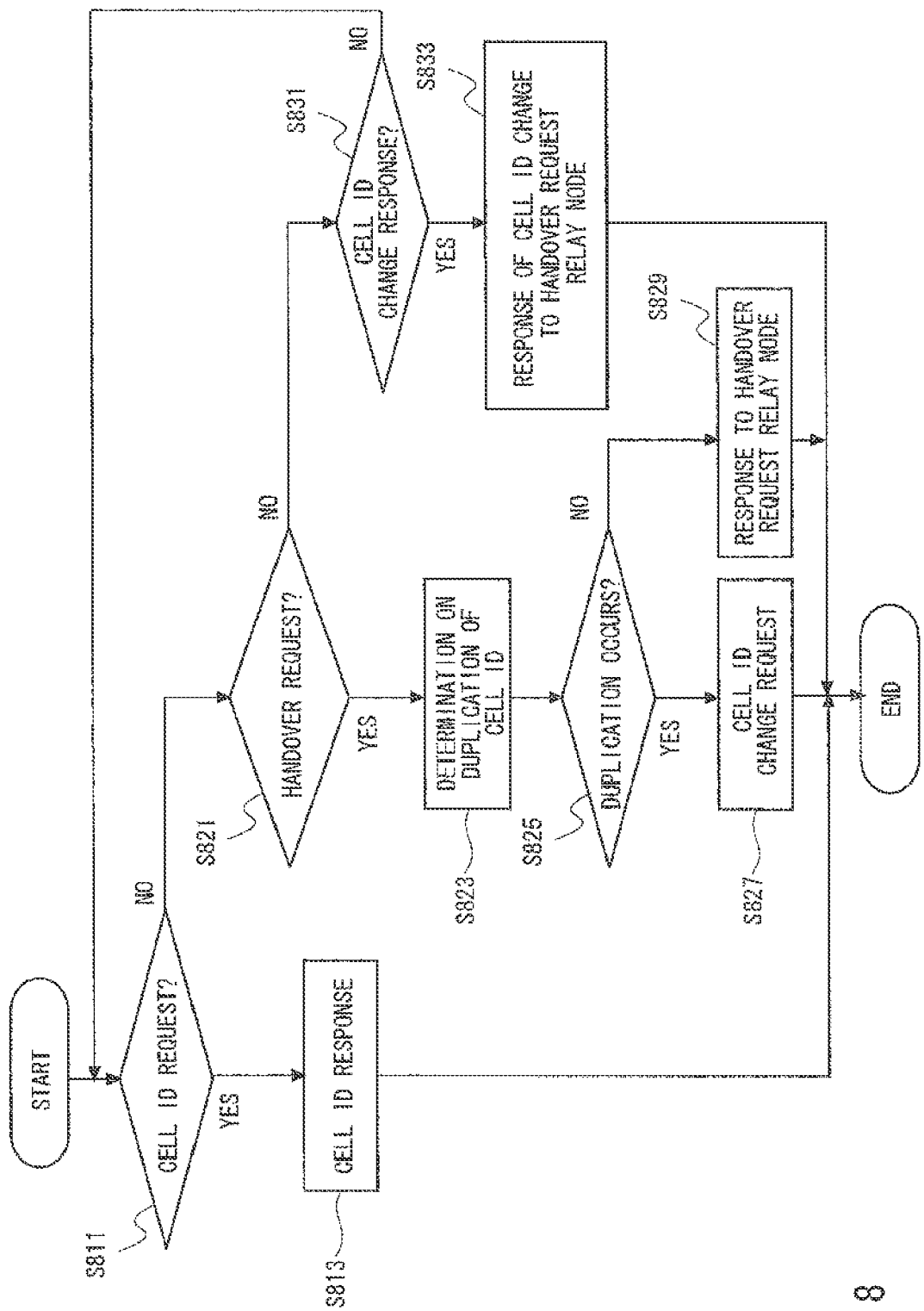
FIG. 8 is a flowchart showing a processing procedure of the relay node identification information management server according to the second exemplary embodiment of the invention.

FIG. 8 is a flowchart showing a processing procedure of the relay node identification information management server 206 according to this exemplary embodiment. The flowchart is executed by the CPU 710 with use of the RAM 740, and thereby the functional elements of the relay node identification information management server 206 and the process of FIGS. 3, 4 and 6 are implemented.

First, in Step S811, it is determined whether it is an initial request for a cell ID from a relay node. When it is a request for a cell ID, the process proceeds to Step S813, determines a cell ID to be assigned to the relay node that has made the request and then sends a response.

In Step S821, it is determined whether it is a request for an inter-base station handover from a relay node. When it is a request for an inter-base station handover, the process proceeds to Step S823 and determines whether duplication of cell IDs of relay nodes occurs after the inter-base station handover. When it is determined that there is no duplication, the process proceeds from Step S825 to Step S829 and sends a response for permission back to the relay node that has made the handover request. On the other hand, when it is determined that there is duplication, the process proceeds from Step S825 to Step S827 and makes a request for change of a cell ID to one of the relay nodes having the duplicate cell IDs.

In Step S831, it is determined whether it is a response for completion of cell ID change from the relay node that has made the cell ID change request. When it is a response for completion of cell ID change, the process proceeds to Step S833 and sends a response for cell ID change to the relay node that has made the handover request.

<Hardware Configuration of Relay Node>

Figure 9:
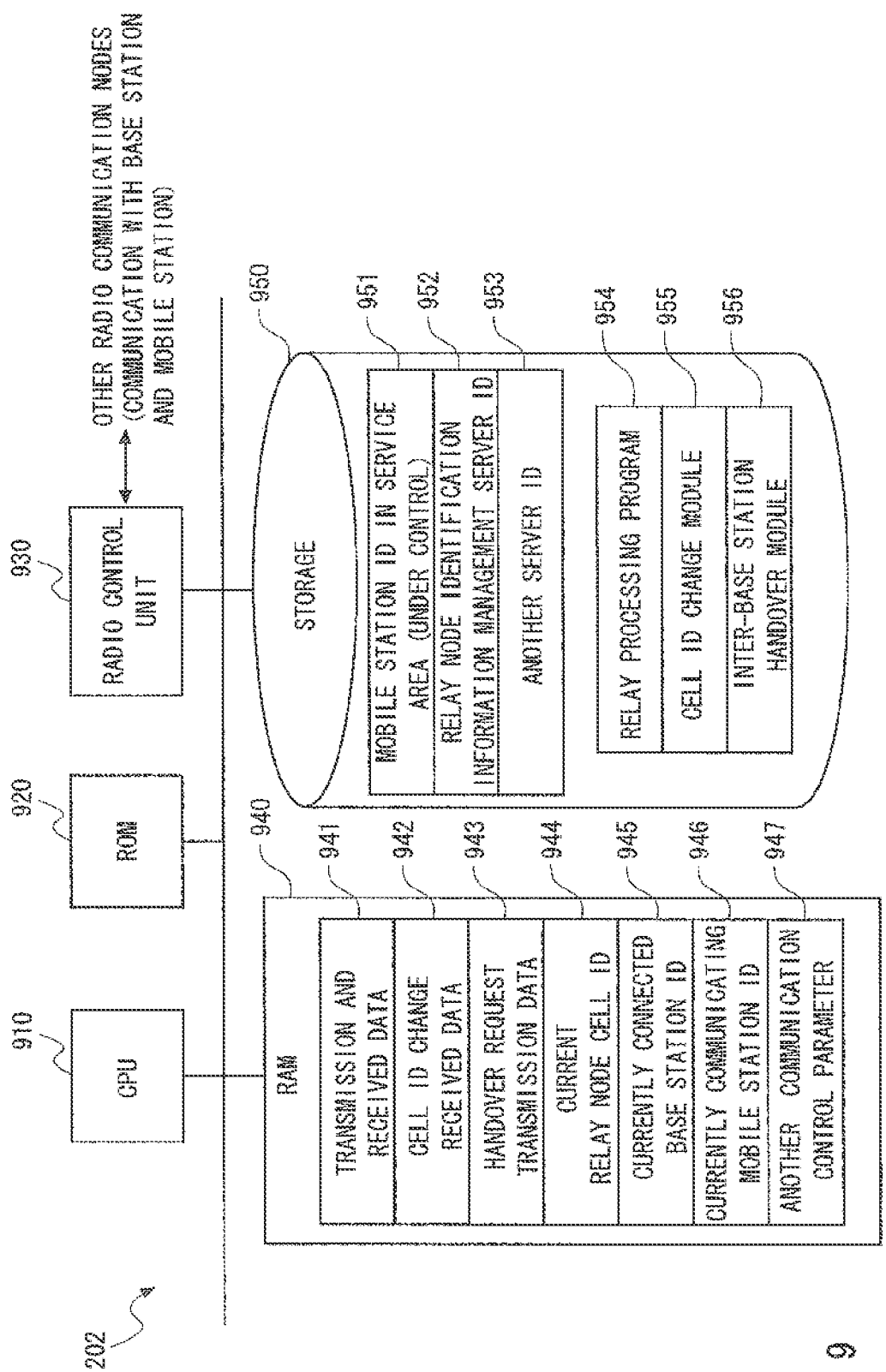
FIG. 9 is a block diagram showing a hardware configuration of a relay node according to the second exemplary embodiment of the invention.

FIG. 9 is a block diagram showing a hardware configuration of the relay node 202 according to this exemplary embodiment. FIG. 9 shows only the elements related to this exemplary embodiment.

In FIG. 9, a CPU 910 is an arithmetic control processor and implements the functional elements of FIG. 2 by executing a program. A ROM 920 stores fixed data and program such as initial data and program. A communication control unit 930 is a control unit for communicating with a base station and a mobile station. The communication of a relay node with a base station and a mobile station is wireless.

A RAM 940 is a random access memory that is used as a temporary storage work area by the CPU 910. The RAM 940 has an area to store data required for implementation of this exemplary embodiment. Specifically, the reference numeral 941 indicates transmission and received data to be transmitted and received with the base station and the mobile station. The reference numeral 942 indicates received data of a cell ID change request from the relay node identification information management server 206 among the received data. The reference numeral 943 indicates transmission data of a handover request to be transmitted to a base station and the relay node identification information management server 206. The reference numeral 944 indicates the current relay node cell ID. The reference numeral 945 indicates a base station ID of the base station currently connected (under control thereof). The reference numeral 946 indicates a mobile station ID of the mobile station currently under communication. The reference numeral 947 indicates other control parameters.

A storage 950 stores database, various parameters, and the following data and programs required for implementation of this exemplary embodiment. The reference numeral 951 indicates a mobile station ID in the service area (under control) of the relay node. The reference numeral 952 indicates ID of a relay node identification information management server by which the relay node is managed. Further, the reference numeral 953 indicates is ID of another server. The storage 950 stores the following program. The reference numeral 954 indicates a relay processing program that controls relay processing of a relay node. The reference numeral 955 indicates a cell ID change module that is contained in the relay processing program 954 and performs cell ID change processing (see FIG. 10). The reference numeral 956 indicates an inter-base station handover module that is contained in the relay processing program 954 and performs an inter-base station handover (see FIG. 10).

Note that only the data and program required for this exemplary embodiment are shown in FIG. 9, and general-purpose data and program such as OS are not shown.

<Processing Procedure of Relay Node>

Figure 10:
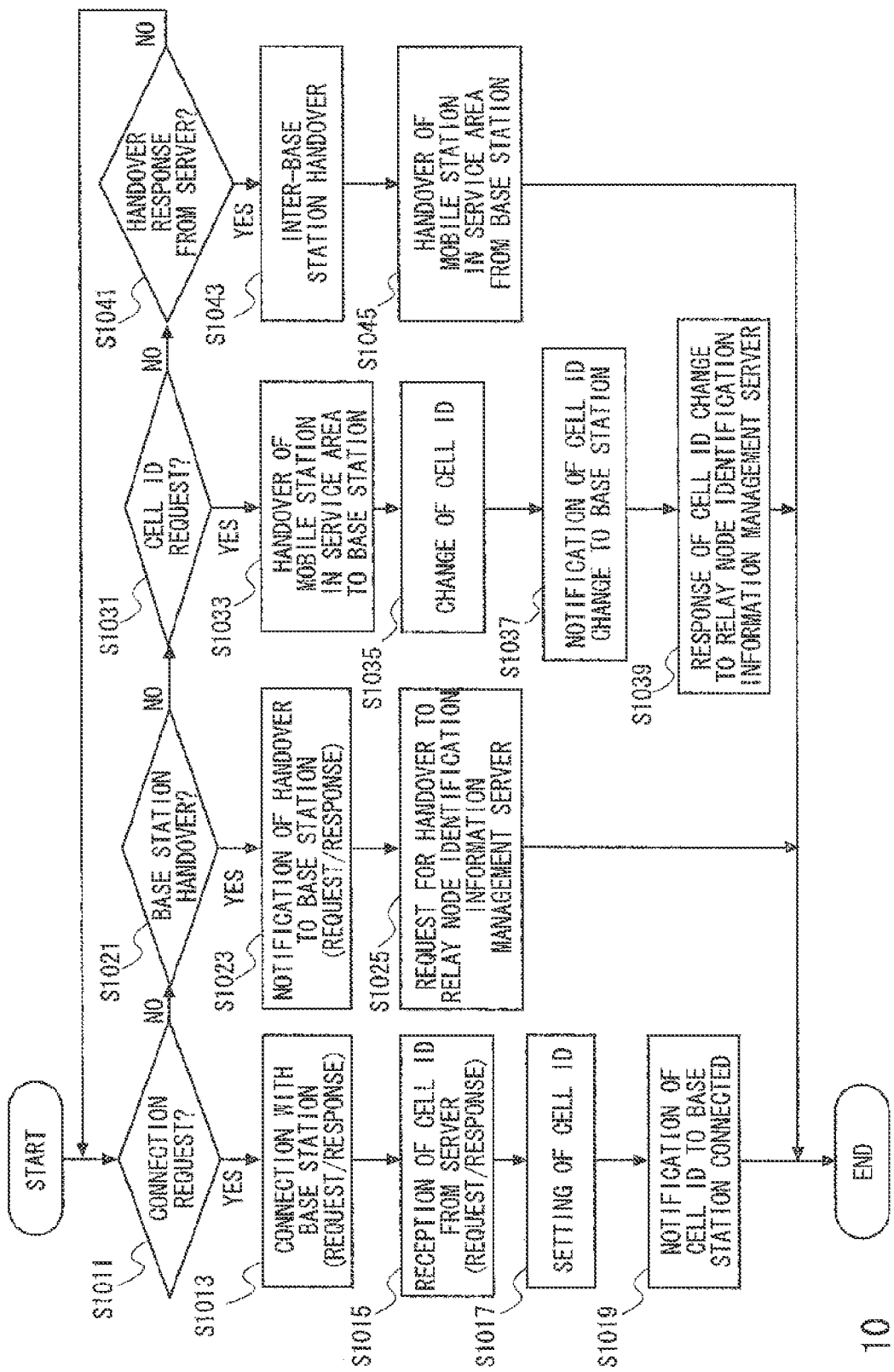
FIG. 10 is a flowchart showing a processing procedure of the relay node according to the second exemplary embodiment of the invention.

FIG. 10 is a flowchart showing a processing procedure of the relay node 202 according to this exemplary embodiment. This flowchart is executed by a CPU 910 with use of a RAM 940, and thereby the functional elements of the relay node 202 and the process of FIGS. 3, 4 and 6 are implemented.

First, in Step S1011, it is determined whether it is an initial request for connection to a base station. When it is a request for connection, the process proceeds to Step S1013 and makes a connection to the base station (i.e. a connection request and response). Next, in Step S1015, the cell ID assigned by the relay node identification information management server is received. In Step S1017, the received cell ID is set to its device. In Step S1019, the cell ID is notified to the base station being connected.

In Step S1021, it is determined whether it is a request for an inter-base station handover. When it is a request for an inter-base station handover, the process proceeds to Step S1023 and gives a notification of a handover to the base station being connected. Then, in Step S1025, a handover is requested to the relay node identification information management server.

In Step S1031, it is determined whether it is a request for cell ID change. When it is a request for cell ID change, the process proceeds to Step S1033 and makes an inter-cell handover of mobile stations communicating with the relay node in the service area, which are mobile stations under its control, to the base station. When the inter-cell handover is done and all the mobile stations that have been under its control are now under control of the base station, the cell ID is changed to the cell ID specified by the relay node identification information management server in Step S1035. In Step S1037, the change of cell ID is notified to the base station. In Step S1039, a response indicating the completion of cell ID change is sent to the relay node identification information management server.

In Step S1041, it is determined whether it is a response from the relay node identification information management server in response to a request for an inter-base station handover. When it is a response from the relay node identification information management server, the process proceeds to Step S1043 and carries out the inter-base station handover. Then, in Step S1045, the mobile stations that have been under control of the base station are connected again to its service area (under its control) by an inter-cell handover.

Third Exemplary Embodiment

A mobile communication system according to a third exemplary embodiment of the invention is described hereinafter. The mobile communication system according to this exemplary embodiment is different from that of the second exemplary embodiment in that the cell ID of a relay node that makes an inter-base station handover is changed. However, the fact that the mobile relay node makes an inter-base station handover means that the communication environment with a base station before the inter-base station handover is degraded, and therefore there is a possibility that mobile stations under its control cannot be temporarily handed over to a base station to which the mobile relay node is connected in order to change the mobile relay node identification information. In some cases, however, this can be better than changing the mobile relay node identification information of the other mobile relay node on the whole. In view of the above, an example in which an inter-cell handover is made to a handover destination base station is described in this exemplary embodiment, through not limited thereto. The other elements and operations are the same as those of the second exemplary embodiment and thus denoted by the same reference numerals and not described in detail.

<Configuration of Mobile Communication System when there is Duplication of Identification Information>

The configuration of the mobile communication system before the inter-base station handover is the same as in FIG. 5A and not redundantly described.

(Configuration After Inter-Base Station Handover of Relay Node)

Figure 11:
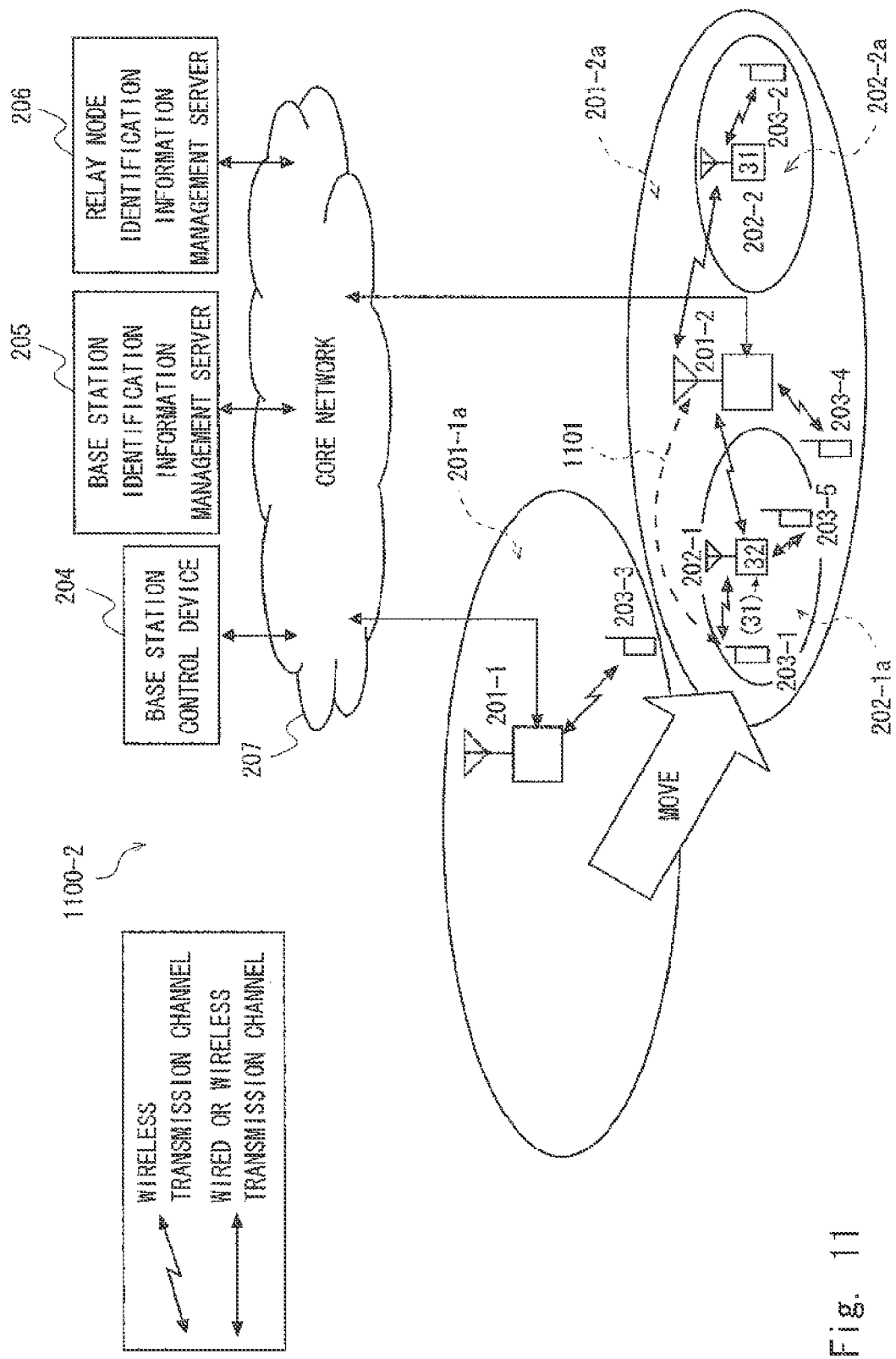
FIG. 11 is a diagram showing a configuration after an inter-base station handover of a relay node in a mobile communication system according to a third exemplary embodiment of the invention.

FIG. 11 is a diagram showing a configuration after the inter-base station handover of a relay node in the mobile communication system according to this exemplary embodiment.

FIG. 11 is different from FIG. 5B in that the mobile relay node cell ID of the mobile relay node 202-2 remains "31" and the mobile relay node cell ID of the mobile relay node 202-1 that makes the inter-base station handover is changed from "31" to "32". Accordingly, the mobile station 203-1 that is communicating with, or under control of, the mobile relay node 202-1 in the service area of the mobile relay node 202-1 makes the inter-cell handover to the base station 201-2 temporarily before change of the mobile relay node cell ID as indicated by the reference numeral 1101 in FIG. 11. Then, after change of the mobile relay node cell ID, the inter-cell handover is made again from the base station 201-2 to the mobile relay node 202-1. This operation allows change of the mobile relay node cell ID of the mobile relay node 202-1 without interrupting the communication of the mobile station 203-1.

<Operation Procedure of Mobile Communication System when there is Duplication of Identification Information>
(Inter-Base Station Handover Procedure when there is Duplication of Identification Information)

Figure 12:
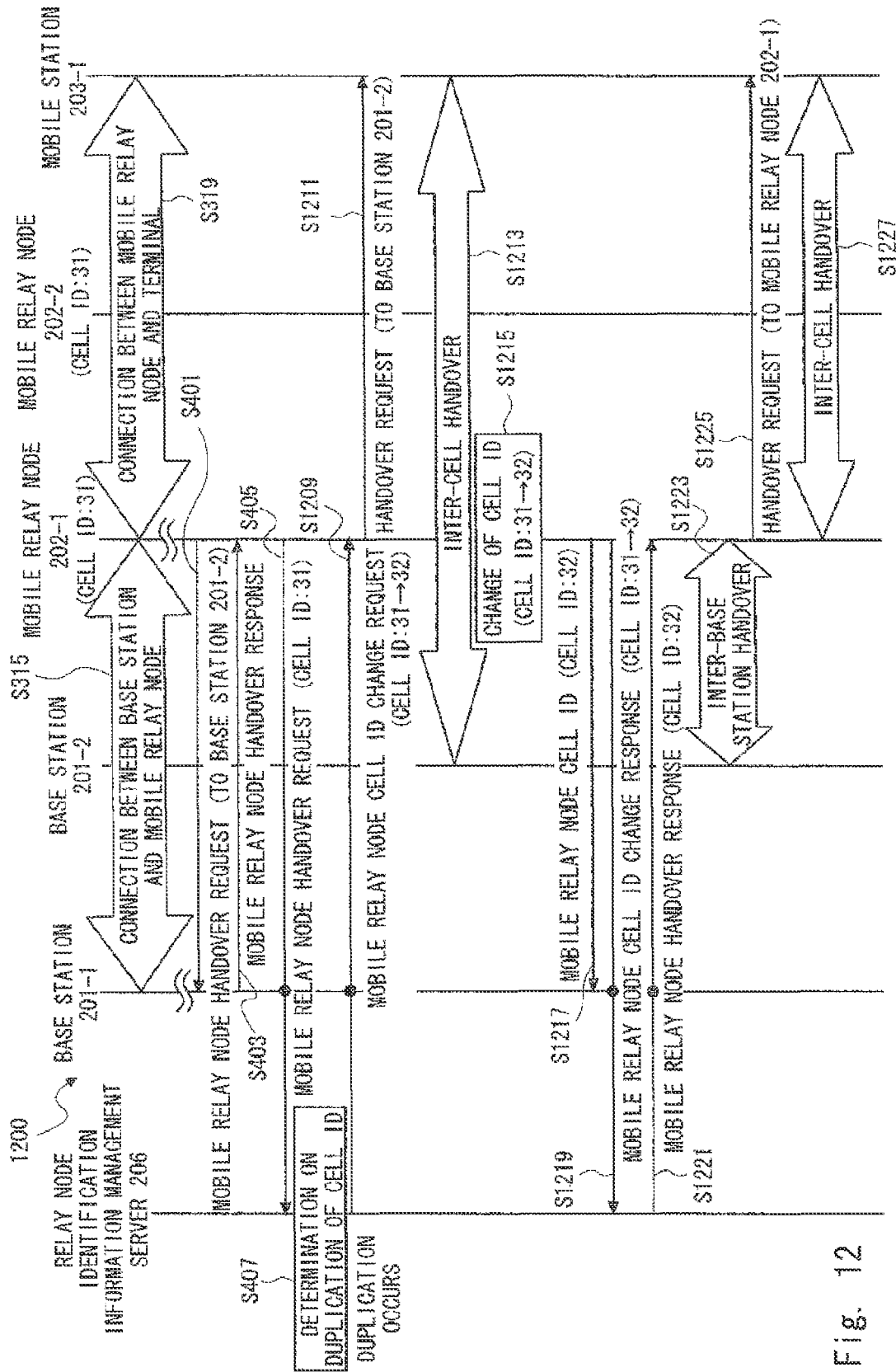
FIG. 12 is a sequence chart showing an inter-base station handover procedure of a relay node in the case where there is duplication of identification information in the mobile communication system according to the third exemplary embodiment of the invention.

FIG. 12 is a sequence chart showing an inter-base station handover procedure 1200 of a relay node in the case where there is duplication of identification information in the mobile communication system according to this exemplary embodiment. FIG. 12 shows the relay node identification information management server 206, the base stations 201-1 and 201-2, the mobile relay nodes 202-1 and 202-2, and the mobile station 203-1. It is assumed that mobile relay node cell IDs for mobile relay nodes are "31", "32" and "33". Further, the mobile relay node 202-1 is being connected to the base station 201-1, and the mobile relay node cell ID is "31". On the other hand, the mobile relay node 202-2 is being connected to the base station 201-2, and the mobile relay node cell ID is "31". The mobile station 203-1 is being connected to the mobile relay node 202-1. Note that the same steps as in FIG. 4 are denoted by the same reference numerals.

At the inter-base station handover, in Step S401, the mobile relay node 202-1 transmits "mobile relay node handover request" containing a desired inter-base station handover destination (which is the base station 201-2 in this example) to the base station 201-1 to which it is being connected. Receiving the "mobile relay node handover request", the base station 201-1 transmits "mobile relay node handover response" to the mobile relay node 202-1 in Step S403. The base station 201-1 then starts making preparations for the inter-base station handover.

After that, the mobile relay node 202-1 transmits "mobile relay node handover request" to the relay node identification information management server 206 through the base station 201-1 in Step S405. Receiving the "mobile relay node handover request", the relay node identification information management server 206 determines whether the mobile relay node cell ID (which is "31" in this example) of the mobile relay node 202-1 duplicates the mobile relay node cell IDs of at least nearby mobile relay nodes in Step S407.

Because there is duplication in this example, the relay node identification information management server 206 transmits "mobile relay node cell ID change request" to one of the mobile relay nodes having duplicate IDs (which is the mobile relay node 202-1 in this example) in Step S1209. In this step, the relay node identification information management server 206 transmits a mobile relay node cell ID (which is "32" in this example) that does not duplicate the mobile relay node cell IDs of at least nearby mobile relay nodes as the mobile relay node cell ID after change, as "mobile relay node cell ID change request". Receiving the "mobile relay node cell ID change request", the mobile relay node 202-1 transmits "handover request" indicating the inter-cell handover to the base station to which the mobile relay node 202-1 is handed over (which is the base station 201-2 in this example) to all mobile stations under its control including the mobile station 203-1 in Step S1211. Receiving the "handover request", all the mobile stations including the mobile station 203-1 under control of the mobile relay node 202-1 make the inter-cell handover to the base station 201-2 in Step S1213.

In this step, in order to ensure that all the mobile stations including the mobile station 203-1 under control of the mobile relay node 202-1 make the inter-cell handover from the base station 201-1 to the base station 201-2, the transmission power of each common signal of the mobile relay node 202-2 is controlled. Specifically, the transmission power of each common signal at the inter-cell handover may be set lower than the previous level.

The mobile relay node 202-1 that no longer has mobile stations under its control changes its mobile relay node cell ID (from "31" to "32" in this example) in Step S1215. Then, in Step S1217, the mobile relay node 202-1 notifies the new mobile relay node cell ID (which is "32" in this example) as "mobile relay node cell ID" to the base station 201-1. Further, the mobile relay node 202-1 notifies the success of cell ID change as "mobile relay node cell ID change response" to the relay node identification information management server 206 in Step S1219. Receiving the "mobile relay node cell ID change response", the relay node identification information management server 206 recognizes that duplication of the cell ID has been eliminated and updates the mobile relay node identification information which it manages. Further, in Step S1221, the relay node identification information management server 206 transmits "mobile relay node handover response" that permits the inter-base station handover to the mobile relay node 202-1 which has transmitted the "mobile relay node handover request" through the base station 201-1.

Receiving the "mobile relay node handover response", the mobile relay node 202-1 carries out the inter-base station handover from the base station 201-1 to the base station 201-2, with the mobile relay node cell ID changed to "32", in Step S1223. After that, the mobile relay node 202-1 connects to the base station 201-2. The base station 201-1 receives the new mobile relay node cell ID (which is "32" in this example) of the mobile relay node 202-1 as the "mobile relay node cell ID" and then transmits "handover request" indicating the inter-cell handover to the mobile relay node 202-1 to all the mobile stations including the mobile station 203-1 that have been under control of the mobile relay node 202-1 before the change of the mobile relay node cell ID of the mobile relay node 202-1 in Step S1225. Receiving the "handover request", all the mobile stations including the mobile station 203-1 that have been under control of the mobile relay node 202-1 before the change of the mobile relay node cell ID of the mobile relay node 202-1 make the inter-cell handover from the base station 201-2 to the mobile relay node 202-2 in Step S1227.

In this step, in order to ensure that all the mobile stations including the mobile station 203-1 that have been under control of the mobile relay node 202-1 before the change of the mobile relay node cell ID of the mobile relay node 202-1 make the inter-cell handover from the base station 201-2 to the mobile relay node 202-1, the transmission power of each common signal of the mobile relay node 202-1 is controlled. Specifically, the transmission power of each common signal before the inter-cell handover prior to the change of the mobile relay node cell ID may be stored in the mobile relay node 202-1, and each common signal is transmitted at the same or slightly higher transmission power than the stored transmission power.

Note that either of the inter-base station handover of the mobile relay node 202-1 and the inter-cell handover of all the mobile stations including the mobile station 203-1 that have been under control of the mobile relay node 202-1 before the change of the mobile relay node cell ID of the mobile relay node 202-1 from the base station 201-2 to the mobile relay node 202-1 may be performed first. In this exemplary embodiment, the mobile relay node identification information is not particularly limited. For example, it may be a cell ID, information about the timing of transmission and reception, information about the channel quality, information about the traffic amount, the movement speed of the mobile relay node or the like.

Fourth Exemplary Embodiment

A mobile communication system according to a fourth exemplary embodiment of the invention is described hereinafter. The mobile communication system according to this exemplary embodiment is different from that of the above-described second and third exemplary embodiments in that one of relay nodes is a stationary relay node. The other elements and operations are the same as those of the second and third exemplary embodiments and thus denoted by the same reference numerals and not described in detail.
<Configuration of Mobile Communication System when there is Duplication of Identification Information>
(Configuration After Inter-Base Station Handover of Relay Node)
FIG. 11 is a diagram showing a configuration after the inter-base station handover of a relay node in the mobile communication system according to this exemplary embodiment.

Figure 13:
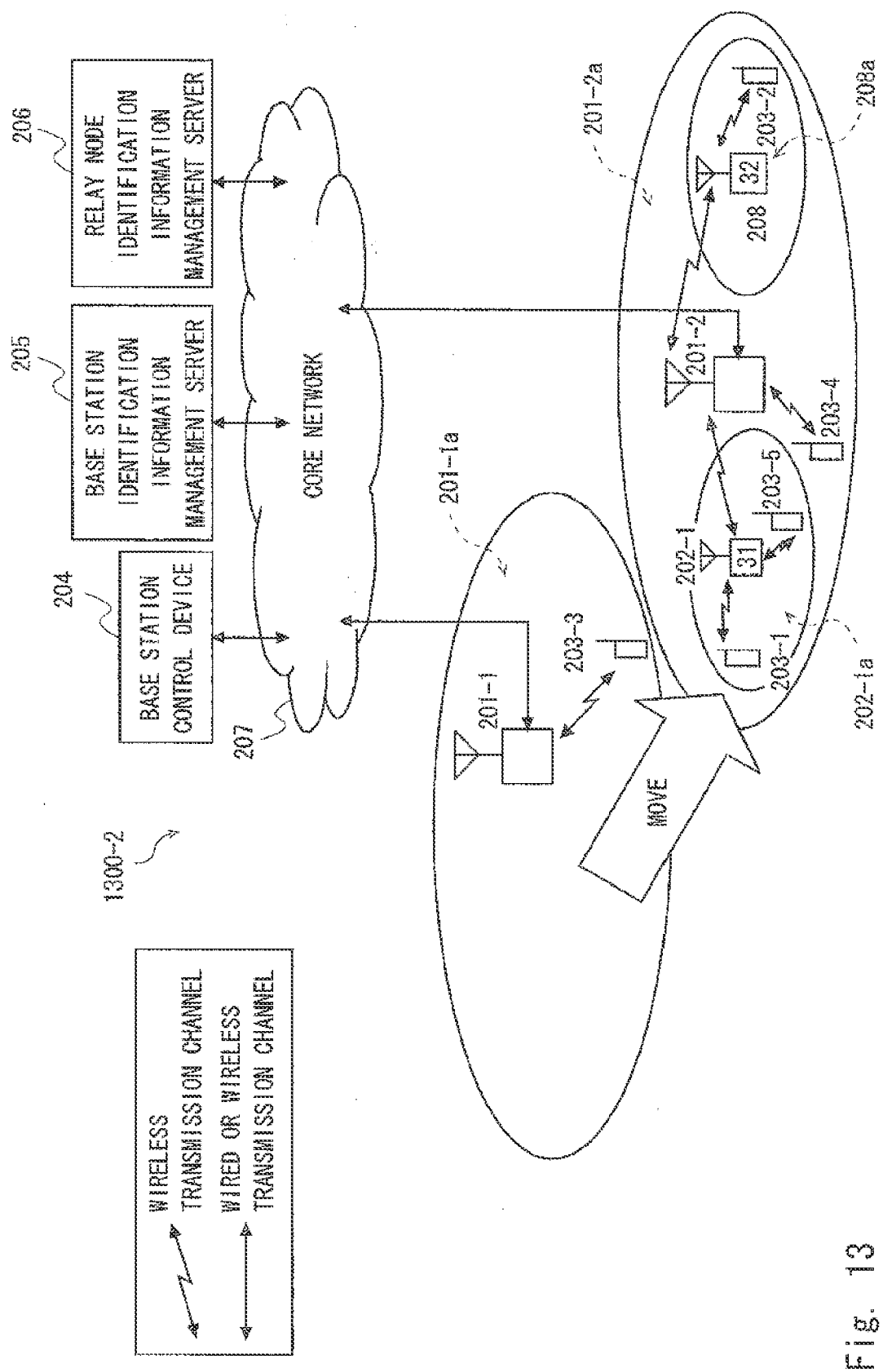
FIG. 13 is a diagram showing a configuration after an inter-base station handover of a relay node in a mobile communication system according to a fourth exemplary embodiment of the invention.

In FIG. 13, the mobile relay node 202-1 moves to the service area 201-2a of the base station 201-2 by the inter-base station handover. In the service area 201-2a of the base station 201-2, a service area 208a of a stationary relay node 208 is included.

In this configuration also, the change of the mobile relay node cell ID, the inter-cell handover of mobile stations under control to a base station before change, and the inter-cell handover of the mobile stations from the base station after change are carried out in the same manner as in FIGS. 2B, 5B and 11 in order to avoid duplication of the mobile relay node cell ID.

Other Exemplary Embodiments

Although the exemplary embodiments of the present invention are described in detail above, a system or a device that combines different features included in the respective exemplary embodiments is also included within the scope of the present invention.

Further, the present invention may be applied to a system composed of a plurality of equipment or may be applied to a single device. Further, the present invention is also applicable to the case where a control program that implements the functions of the exemplary embodiments is supplied directly or remotely to the system or the device. Thus, in order to implement the functions of the present invention on a computer, a control program to be installed into the computer, a medium storing the control program, and a WWW (World Wide Web) sever to download the control program are also included within the scope of the present invention.

Although the present invention is described as a hardware configuration in the above exemplary embodiments, the present invention is not limited thereto. The present invention may be implemented by causing a CPU (Central Processing Unit) to execute a computer program to perform a given process.

Further, the above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese patent application No. 2011-080950, filed on Mar. 31, 2011, the disclosure of which is incorporated herein in its entirety by reference.

Other Representations of Exemplary Embodiments

The whole or part of the exemplary embodiments disclosed above can be described as, but not limited to, the following supplementary notes.
(Supplementary Note 1)
A mobile communication system including a mobile relay node that relays communication between a base station and a mobile station, the system comprising:
duplication determination means for determining whether a situation where a plurality of relay nodes having the same identification information exist in a service area of one base station occurs before the mobile relay node moves from one base station to another and makes an inter-base station handover;
identification information change means for changing identification information of a relay node so that identification information are different from each other when the duplication determination means determines that the situation where a plurality of relay nodes having the same identification information exist in one base station occurs;
handover means for making an inter-base station handover of the relay node that moves from one base station to another after the identification information of the relay node is changed; and
service continuation means for making a handover of a mobile station communicating with a relay node whose identification information is to be changed by the identification information change means in a service area of the relay node from the relay node to a base station and thereby continuing a service for the mobile station by the base station, and, after the identification information of the relay node is changed, making a handover of the mobile station having been communicating with the relay node in the service area from the base station to the relay node and thereby restarting a service by the relay node.
(Supplementary Note 2)
The mobile communication system according to Supplementary note 1, wherein
the duplication determination means includes identification information registration means for registering identification information in association with a base station and a relay node, and determines that identification information duplicate each other when identification information of the mobile relay node that makes the inter-base station handover is the same as identification information of a relay node located in a handover-destination base station prestored in the identification information registration means.
(Supplementary Note 3)

The mobile communication system according to Supplementary note 1 or 2, wherein the identification information change means changes identification information of a relay node located in a handover-destination base station and having the same identification information as the mobile relay node that makes the inter-base station handover.
(Supplementary Note 4)

The mobile communication system according to Supplementary note 3, wherein the service continuation means makes a handover of a mobile station communicating with the relay node located in the handover-destination base station in a service area of the relay node temporarily from the relay node to the base station, and, after the identification information of the relay node located in the handover-destination base station is changed, makes a handover of the mobile station having been communicating with the relay node located in the handover-destination base station in the service area of the relay node back from the base station to the relay node and thereby continues a service for the mobile station.
(Supplementary Note 5)

The mobile communication system according to Supplementary note 1 or 2, wherein the identification information change means changes identification information of the mobile relay node that makes the inter-base station handover.
(Supplementary Note 6)

The mobile communication system according to Supplementary note 5, wherein the service continuation means makes a handover of a mobile station communicating with a relay node that makes the inter-base station handover in a service area of the relay node temporarily from the relay node to the handover-destination base station, and, after the identification information of the relay node that makes the inter-base station handover is changed, makes a handover of the mobile station having been communicating with the relay node that makes the inter-base station handover in the service area of the relay node back from the base station to the relay node, and thereby continues a service for the mobile station.
(Supplementary Note 7)

A relay node control method in a mobile communication system including a mobile relay node that relays communication between a base station and a mobile station, the method comprising:

a duplication determination step of determining whether a situation where a plurality of relay nodes having the same identification information exist in a service area of one base station occurs before the mobile relay node moves from one base station to another and makes an inter-base station handover;

an identification information change step of changing identification information of a relay node so that identification information are different from each other when the duplication determination step determines that the situation where a plurality of relay nodes having the same identification information exist in one base station occurs;

a handover step of making an inter-base station handover of the relay node that moves from one base station to another after the identification information of the relay node is changed; and a service continuation step of making a handover of a mobile station communicating with a relay node whose identification information is to be changed in the identification information change step in a service area of the relay node from the relay node to a base station and thereby continuing a service for the mobile station by the base station, and, after the identification information of the relay node is changed, making a handover of the mobile station having been communicating with the relay node in the service area from the base station to the relay node and thereby restarting a service by the relay node.
(Supplementary Note 8)

A relay node management device that manages identification information of a mobile relay node that relays communication between a base station and a mobile station, the device comprising:

registration means for registering identification information in association with a base station and a relay node;

duplication determination means for determining whether a situation where a plurality of relay nodes having the same identification information exist in a service area of one base station occurs before the mobile relay node moves from one base station to another and makes an inter-base station handover;

change instruction means for instructing a relay node to change identification information so that identification information are different from each other when the duplication determination means determines that the situation where a plurality of relay nodes having the same identification information exist occurs; and permission means for permitting an inter-base station handover of the mobile relay node upon receiving an identification information change response from the relay node.
(Supplementary Note 9)

A control method of a relay node management device that manages identification information of a mobile relay node that relays communication between a base station and a mobile station, the method comprising:

a registration step of registering identification information in association with a base station and a relay node;

a duplication determination step of determining whether a situation where a plurality of relay nodes having the same identification information exist in a service area of one base station occurs before the mobile relay node moves from one base station to another and makes an inter-base station handover;

a change instruction step of instructing a relay node to change identification information so that identification information are different from each other when the duplication determination step determines that the situation where a plurality of relay nodes having the same identification information exist occurs; and a permission step of permitting an inter-base station handover of the mobile relay node upon receiving an identification information change response from the relay node.
(Supplementary Note 10)

A non-transitory computer readable medium storing a control program of a relay node management device that manages identification information of a mobile relay node that relays communication between a base station and a mobile station, the control program causing a computer to execute:

a registration step of registering identification information in association with a base station and a relay node;

a duplication determination step of determining whether a situation where a plurality of relay nodes having the same identification information exist in a service area of one base station occurs before the mobile relay node moves from one base station to another and makes an inter-base station handover;

a change instruction step of instructing a relay node to change identification information so that identification information are different from each other when the duplication determination step determines that the situation where a plurality of relay nodes having the same identification information exist occurs; and a permission step of permitting an inter-base station handover of the mobile relay node upon receiving an identification information change response from the relay node.

(Supplementary Note 11)

A mobile relay node that relays communication between a base station and a mobile station, comprising:

instruction means for interrupting a service for a mobile station communicating with the relay node in a service area of the relay node and instructing a handover to a base station to which the relay node is connected when an instruction for change of identification information is made;

notification means for changing identification information and notifying the changed identification information to the base station to which the relay node is connected; and service restart means for restarting a service for the mobile station upon receiving a handover request from the mobile station made in accordance with a handover request from the base station to which the relay node is connected.

(Supplementary Note 12)

A control method of a mobile relay node that relays communication between a base station and a mobile station, the method comprising:

an instruction step of interrupting a service for a mobile station communicating with the relay node in a service area of the relay node and instructing a handover to a base station to which the relay node is connected when an instruction for change of identification information is made;

a notification step of changing identification information and notifying the changed identification information to the base station to which the relay node is connected; and a service restart step of restarting a service for the mobile station upon receiving a handover request from the mobile station made in accordance with a handover request from the base station to which the relay node is connected.

(Supplementary Note 13)

A non-transitory computer readable medium storing a control program of a mobile relay node that relays communication between a base station and a mobile station, the program causing a computer to execute:

an instruction step of interrupting a service for a mobile station communicating with the relay node in a service area of the relay node and instructing a handover to a base station to which the relay node is connected when an instruction for change of identification information is made;

a notification step of changing identification information and notifying the changed identification information to the base station to which the relay node is connected; and a service restart step of restarting a service for the mobile station upon receiving a handover request from the mobile station made in accordance with a handover request from the base station to which the relay node is connected.

The invention claimed is:

1. A mobile communication system including a mobile relay node that relays communication between a base station and a mobile station, the system comprising:

a duplication determination unit that determines whether a situation where a plurality of relay nodes having the same identification information exist in a service area of one base station occurs before the mobile relay node moves from one base station to another and makes an inter-base station handover;

an identification information change unit that changes identification information of a relay node so that identification information are different from each other when the duplication determination unit determines that the situation where a plurality of relay nodes having the same identification information exist in one base station occurs;

a handover unit that makes an inter-base station handover of the relay node that moves from one base station to another after the identification information of the relay node is changed; and a service continuation unit that makes a handover of a mobile station communicating with a relay node whose identification information is to be changed by the identification information change unit in a service area of the relay node from the relay node to a base station and thereby continues a service for the mobile station by the base station, and, after the identification information of the relay node is changed, makes a handover of the mobile station having been communicating with the relay node in the service area from the base station to the relay node and thereby restarts a service by the relay node.

2. The mobile communication system according to claim 1, wherein the duplication determination unit includes an identification information registration unit that registers identification information in association with a base station and a relay node, and determines that identification information duplicate each other when identification information of the mobile relay node that makes the inter-base station handover is the same as identification information of a relay node located in a handover-destination base station prestored in the identification information registration unit.

3. The mobile communication system according to claim 1, wherein the identification information change unit changes identification information of a relay node located in a handover-destination base station and having the same identification information as the mobile relay node that makes the inter-base station handover.

4. The mobile communication system according to claim 3, wherein the service continuation unit makes a handover of a mobile station communicating with the relay node located in the handover-destination base station in a service area of the relay node temporarily from the relay node to the base station, and, after the identification information of the relay node located in the handover-destination base station is changed, makes a handover of the mobile station having been communicating with the relay node located in the handover-destination base station in the service area of the relay node back from the base station to the relay node and thereby continues a service for the mobile station.

5. The mobile communication system according to claim 1, wherein the identification information change unit changes identification information of the mobile relay node that makes the inter-base station handover.

6. The mobile communication system according to claim 5, wherein the service continuation unit makes a handover of a mobile station communicating with the relay node that makes the inter-base station handover in a service area of the relay node temporarily from the relay node to the handover-destination base station, and, after the identification information of the relay node that makes the inter-base station handover is changed, makes a handover of the mobile station having been communicating with the relay node that makes the inter-base station handover in the service area of the relay node back from the base station to the relay node, and thereby continues a service for the mobile station.

7. A relay node management device that manages identification information of a mobile relay node that relays communication between a base station and a mobile station, the device comprising:
- a registration unit that registers identification information in association with a base station and a relay node;
- a duplication determination unit that determines whether a situation where a plurality of relay nodes having the same identification information exist in a service area of one base station occurs before the mobile relay node moves from one base station to another and makes an inter-base station handover;
- a change instruction unit that instructs a relay node to change identification information so that identification information are different from each other when the duplication determination unit determines that the situation where a plurality of relay nodes having the same identification information exist occurs; and
- a permission unit that permits an inter-base station handover of the mobile relay node upon receiving an identification information change response from the relay node.

8. A control method of a relay node management device that manages identification information of a mobile relay node that relays communication between a base station and a mobile station, the method comprising:
- registering identification information in association with a base station and a relay node;
- determining whether a situation where a plurality of relay nodes having the same identification information exist in a service area of one base station occurs before the mobile relay node moves from one base station to another and makes an inter-base station handover;
- instructing a relay node to change identification information so that identification information are different from each other when the duplication determination step determines that the situation where a plurality of relay nodes having the same identification information exist occurs; and
- permitting an inter-base station handover of the mobile relay node upon receiving an identification information change response from the relay node.

* * * * *